US011900011B2

(12) United States Patent
Chaudhri et al.

(10) Patent No.: US 11,900,011 B2
(45) Date of Patent: *Feb. 13, 2024

(54) AUDIO FILE INTERFACE

(71) Applicant: Apple Inc., Cupertino, CA (US)

(72) Inventors: Imran Chaudhri, San Francisco, CA (US); Scott M. Herz, San Jose, CA (US); Sean Boland Kelly, San Francisco, CA (US); Scott Forstall, Los Altos, CA (US); Gregory N. Christie, San Jose, CA (US); Kevin Tiene, Cupertino, CA (US); Steven P. Jobs, Palo Alto, CA (US)

(73) Assignee: Apple Inc., Cupertino, CA (US)

(*) Notice: Subject to any disclaimer, the term of this patent is extended or adjusted under 35 U.S.C. 154(b) by 201 days.

This patent is subject to a terminal disclaimer.

(21) Appl. No.: 17/195,501

(22) Filed: Mar. 8, 2021

(65) Prior Publication Data

US 2021/0247956 A1 Aug. 12, 2021

Related U.S. Application Data

(63) Continuation of application No. 16/581,673, filed on Sep. 24, 2019, now Pat. No. 10,942,699, which is a
(Continued)

(51) Int. Cl.
*H04M 1/00* (2006.01)
*G06F 3/16* (2006.01)
(Continued)

(52) U.S. Cl.
CPC ............ *G06F 3/165* (2013.01); *G06F 3/0202* (2013.01); *G06F 3/0481* (2013.01);
(Continued)

(58) Field of Classification Search
None
See application file for complete search history.

(56) References Cited

U.S. PATENT DOCUMENTS 5,483,261 A 1/1996 Yasutake
5,488,204 A 1/1996 Mead et al.
(Continued)

FOREIGN PATENT DOCUMENTS

EP 1873635 A1 1/2008
JP 2000-163031 A 6/2000
(Continued)

OTHER PUBLICATIONS

Final Office Action received for U.S. Appl. No. 11/849,833, dated Jan. 3, 2012, 24 pages.
(Continued)

*Primary Examiner* — Willie J Daniel, Jr.
(74) *Attorney, Agent, or Firm* — Kubota & Basol LLP

(57) ABSTRACT

Methods, systems, and computer-readable medium for providing an audio file interface. In one implementation, a method is provided. The method includes, while playing an audio file on a mobile device and displaying a current view in a user interface of the mobile device, receiving first user input requesting that an audio interface be displayed, and displaying the audio interface as an overlay in the user interface, where the audio interface includes information associated with the audio file.

55 Claims, 14 Drawing Sheets

Related U.S. Application Data continuation of application No. 15/333,053, filed on Oct. 24, 2016, now Pat. No. 10,452,341, which is a continuation of application No. 11/849,833, filed on Sep. 4, 2007, now Pat. No. 9,477,395.

(51) Int. Cl.

| | | |
|---|---|---|
| *G06F 3/0481* | (2022.01) | |
| *H04M 1/72442* | (2021.01) | |
| *G06F 3/0488* | (2022.01) | |
| *G06F 3/02* | (2006.01) | |
| *G06F 3/04847* | (2022.01) | |

(52) U.S. Cl.
CPC ........ *G06F 3/0488* (2013.01); *G06F 3/04847* (2013.01); *G06F 3/167* (2013.01); *H04M 1/72442* (2021.01); *G06F 2203/04804* (2013.01); *H04M 2250/22* (2013.01)

(56) References Cited

U.S. PATENT DOCUMENTS

| | | | |
|---|---|---|---|
| 5,825,352 | A | 10/1998 | Bisset et al. |
| 5,835,079 | A | 11/1998 | Shieh |
| 5,880,411 | A | 3/1999 | Gillespie et al. |
| 6,188,391 | B1 | 2/2001 | Seely et al. |
| 6,310,610 | B1 | 10/2001 | Beaton et al. |
| 6,323,846 | B1 | 11/2001 | Westerman et al. |
| 6,570,557 | B1 | 5/2003 | Westerman et al. |
| 6,677,932 | B1 | 1/2004 | Westerman |
| 6,690,387 | B2 | 2/2004 | Zimmerman et al. |
| 6,888,536 | B2 | 5/2005 | Westerman et al. |
| 7,015,894 | B2 | 3/2006 | Morohoshi |
| 7,126,581 | B2 | 10/2006 | Burk et al. |
| 7,184,064 | B2 | 2/2007 | Zimmerman et al. |
| 7,234,113 | B1 | 6/2007 | Matz et al. |
| 7,248,867 | B2 | 7/2007 | Strawn |
| 7,614,008 | B2 | 11/2009 | Ording |
| 7,619,615 | B1 | 11/2009 | Donoghue |
| 7,633,076 | B2 | 12/2009 | Huppi et al. |
| 7,653,883 | B2 | 1/2010 | Hotelling et al. |
| 7,657,849 | B2 | 2/2010 | Chaudhri et al. |
| 7,663,607 | B2 | 2/2010 | Hotelling et al. |
| 7,844,914 | B2 | 11/2010 | Andre et al. |
| 7,957,762 | B2 | 6/2011 | Herz et al. |
| 8,006,002 | B2 | 8/2011 | Kalayjian et al. |
| 8,239,784 | B2 | 8/2012 | Hotelling et al. |
| 8,279,180 | B2 | 10/2012 | Hotelling et al. |
| 8,381,135 | B2 | 2/2013 | Hotelling et al. |
| 8,479,122 | B2 | 7/2013 | Hotelling et al. |
| 9,348,458 | B2 | 5/2016 | Hotelling et al. |
| 9,477,395 | B2 | 10/2016 | Chaudhri et al. |
| 9,933,937 | B2 | 4/2018 | Lemay et al. |
| 10,452,341 | B2 * | 10/2019 | Chaudhri .............. G06F 3/0481 |
| 2002/0015024 | A1 | 2/2002 | Westerman et al. |
| 2005/0114774 | A1 | 5/2005 | Berryman |
| 2005/0146534 | A1 | 7/2005 | Fong et al. |
| 2005/0190059 | A1 | 9/2005 | Wehrenberg |
| 2006/0017692 | A1 | 1/2006 | Wehrenberg et al. |
| 2006/0033724 | A1 | 2/2006 | Chaudhri et al. |
| 2006/0197753 | A1 | 9/2006 | Hotelling |
| 2007/0028176 | A1 | 2/2007 | Perdomo et al. |
| 2007/0083825 | A1 | 4/2007 | Chaudhri et al. |
| 2007/0101279 | A1 | 5/2007 | Chaudhri et al. |
| 2008/0106513 | A1 | 5/2008 | Morotomi et al. |
| 2008/0304486 | A1 | 12/2008 | Graessley et al. |
| 2008/0307109 | A1 | 12/2008 | Galloway et al. |
| 2009/0007017 | A1 | 1/2009 | Anzures et al. |
| 2009/0061837 | A1 | 3/2009 | Chaudhri et al. |
| 2017/0052759 | A1 | 2/2017 | Chaudhri et al. |
| 2020/0019372 | A1 | 1/2020 | Chaudhri et al. |

FOREIGN PATENT DOCUMENTS

| | | |
|---|---|---|
| JP | 2002-342033 A | 11/2002 |
| WO | 2013/169849 A2 | 11/2013 |
| WO | 2014/105276 A1 | 7/2014 |

OTHER PUBLICATIONS

Final Office Action received for U.S. Appl. No. 11/849,833, dated Sep. 10, 2013, 29 pages.
International Search Report and Written Opinion received for PCT Patent Application No. PCT/US2008/074932, dated Jul. 9, 2009, 15 pages.
Non-Final Office Action received for U.S. Appl. No. 11/849,833, dated Apr. 4, 2011, 17 pages.
Non-Final Office Action received for U.S. Appl. No. 11/849,833, dated Mar. 19, 2013, 26 pages.
Non-Final Office Action received for U.S. Appl. No. 15/333,053, dated Feb. 25, 2019, 6 pages.
Non-Final Office Action received for U.S. Appl. No. 16/581,673, dated Jul. 10, 2020, 7 pages.
Notice of Allowance received for U.S. Appl. No. 11/849,833, dated Aug. 16, 2016, 7 pages.
Notice of Allowance received for U.S. Appl. No. 15/333,053, dated Jun. 12, 2019, 9 pages.
Notice of Allowance received for U.S. Appl. No. 16/581,673, dated Nov. 18, 2020, 8 pages.
Graessley et al., "U.S. Appl. No. 60/945,904, filed Jun. 22, 2007, titled" Multiplexed Data Stream Protocol, 74 pages.
Lee et al., "A Multi-Touch Three Dimensional Touch-Sensitive Tablet", CHI'85 Proceedings, Apr. 1985, pp. 21-25.
Rubine, Dean, "Combining Gestures and Direct Manipulation", CHI'92, May 3-7, 1992, pp. 659-660.
Rubine, Dean H., "The Automatic Recognition of Gestures", CMU-CS-91-202, Submitted in Partial Fulfillment of the Requirements for the Degree of Doctor of Philosophy in Computer Science at Carnegie Mellon University, Dec. 1991, 285 pages.
Westerman, Wayne, "Hand Tracking, Finger Identification, and Chordic Manipulation on a Multi-Touch Surface", A Dissertation Submitted to the Faculty of the University of Delaware in Partial Fulfillment of the Requirements for the Degree of Doctor of Philosophy in Electrical Engineering, 1999, 363 pages.

\* cited by examiner

AUDIO FILE INTERFACE

CROSS REFERENCES TO RELATED APPLICATIONS

This application is a continuation of U.S. application Ser. No. 16/581,673, filed Sep. 24, 2019 and published on Jan. 16, 2020 as U.S. Publication No. 2020-0019372, which is a continuation of U.S. application Ser. No. 15/333,053, filed Oct. 24, 2016 and issued on Oct. 22, 2019 as U.S. Pat. No. 10,452,341, which is a continuation of U.S. patent application Ser. No. 11/849,833, filed Sep. 4, 2007 and issued on Oct. 25, 2016 as U.S. Pat. No. 9,477,395, the contents of which are incorporated herein by reference in their entirety for all purposes.

TECHNICAL FIELD

The subject matter of this patent application is generally related to information presentation.

BACKGROUND

Conventional mobile devices often include an interactive user interface. Typically, a user can input information into the user interface to manipulate/configure/operate the mobile device. For example, the user may enter input such as text, motions, uploads, voice commands, or other information to perform tasks on the mobile device. In some implementations, the user interface can be configured to output or present information related to the user input to the user. The device may produce as output an effect based on the user input. For example, a user input can cause the mobile device to turn on or off.

Whether providing input or receiving output, users generally want to be able to control the system and assess the state of the system at some point in time. As such, the design of a user interface can affect the amount of effort expended by a user in providing input to and interpreting output from the system. In addition, the design may dictate how much effort is spent to learn how to input entries and interpret output. Accordingly, usability and aesthetics can be considered in designing user interfaces for mobile devices.

SUMMARY

A technique, method, apparatus, and system are described to provide an audio file interface. In general, in one aspect, a method is provided. The method includes, while playing an audio file on a mobile device and displaying a current view in a user interface of the mobile device, receiving first user input requesting that an audio interface be displayed, and displaying the audio interface as an overlay in the user interface, where the audio interface includes information associated with the audio file.

Implementations can include one or more of the following features. The overlay can be partially transparent. The audio interface can be displayed as an overlay over the current view displayed in the user interface. In response to the first user input, a new view can be displayed in the user interface, where the new view includes an image associated with the audio file, and the audio interface is displayed as an overlay over the new view displayed in the user interface.

Implementations can include one or more of the following features. The transition from displaying the current view in the user interface to displaying the new view in the user interface can be animated. In one transition animation, a shrinking of the current view in the user interface can be followed by an expanding of the new view in the user interface. In another transition animation, the current view can slide off a vertical edge of the user interface, and the new view can slide on from another vertical edge of the user interface. In yet another animation, a wiping away of the current view from a horizontal edge of the user interface to reveal the new view as it appears from a same horizontal edge of the user interface is animated. A radial wiping away of the current view in the user interface to reveal the new view in the user interface can be animated. An enlarging burning hole in the current view in the user interface can be animated, with an increasing portion of the new view being displayed inside the enlarging burning hole. In another animation transition, an expanding ripple can be animated, with the current view fading out and the new view fading in as the ripple expands.

Implementations can include one or more of the following features. The information associated with the audio file included in the audio interface can include one or more of a performer, a song, an album, a track number, an elapsed time, or a remaining time. The information associated with the audio file included in the audio interface can include a link to a resource where the audio file is accessible, such that selection of the link displays content from the resource. The audio interface can include one or more user interface elements for changing the playing of the audio file. The one or more user interface elements can allow one or more of changing a volume level, pausing, stopping, skipping to a point in the audio file, or skipping to another audio file. The method can include, while the audio interface is displayed in the user interface, receiving second user input requesting that the audio interface not be displayed, and in response to the second user input, displaying the current view in the user interface without the audio interface. The mobile device can include a multi-touch-sensitive display.

In one aspect, a method is provided. The method includes receiving input at a mobile device, where the mobile device includes a user interface with an interface element, determining a state of the interface element or a context of the mobile device, and in response to the received input, performing a predetermined action based on the determination.

Implementations can include one or more of the following features. The predetermined action can be displaying a particular interface on the mobile device. The input can be received at a single hardware button for navigating the user interface of the mobile device.

In one aspect, a mobile device is provided. The mobile device includes a multi-touch-sensitive display, a user interface with an interface element, and a hardware button, where selection of the hardware button causes the mobile device to display a particular interface, and the particular interface is based on a determination of a state of the interface element or a context of the mobile device. Implementations can include the following feature. The hardware button can be for navigating the user interface of the mobile device.

In one aspect, a computer-readable medium is provided. The computer-readable medium has instructions stored thereon, which, when executed by a processor, causes the processor to perform operations including receiving input at a mobile device including a user interface with an interface element, determining a state of the interface element or a context of the mobile device, and in response to the received input, performing a predetermined action based on the determination.

Implementations can include one or more of the following features. The predetermined action can be displaying a particular interface on the mobile device. The input can be received at a single hardware button for navigating the user interface of the mobile device.

DETAILED DESCRIPTION

Example Mobile Device

Figure 1A:
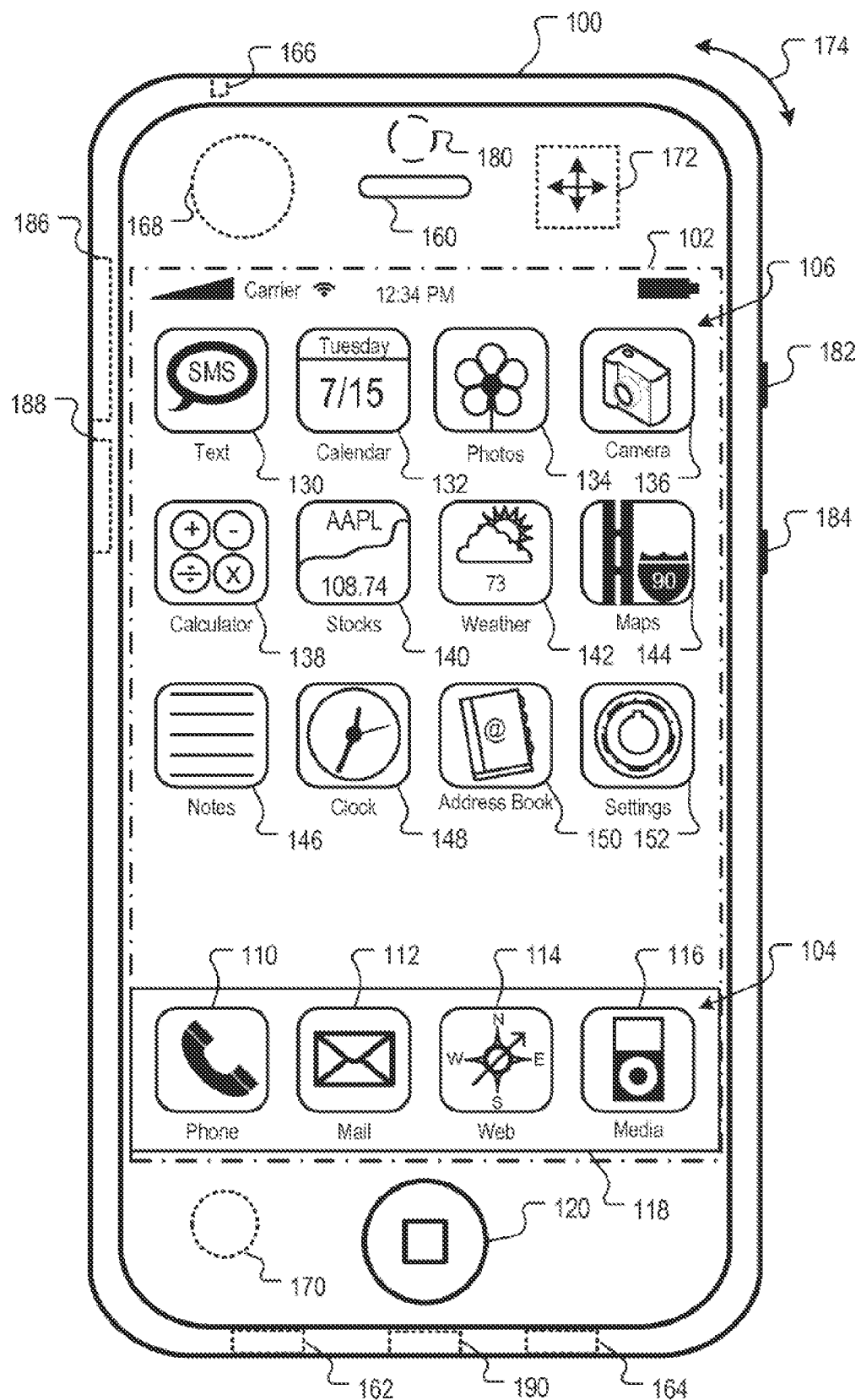
FIG. 1A is a block diagram of an example mobile device.

FIG. 1A is a block diagram of an example mobile device 100. The mobile device 100 can be, for example, a handheld computer, a personal digital assistant, a cellular telephone, a network appliance, a camera, a smart phone, an enhanced general packet radio service (EGPRS) mobile phone, a network base station, a media player, a navigation device, an email device, a game console, or a combination of any two or more of these data processing devices or other data processing devices.

Mobile Device Overview

In some implementations, the mobile device 100 includes a touch-sensitive display 102. The touch-sensitive display 102 can implement liquid crystal display (LCD) technology, light emitting polymer display (LPD) technology, or some other display technology. The touch-sensitive display 102 can be sensitive to haptic and/or tactile contact with a user.

In some implementations, the touch-sensitive display 102 can comprise a multi-touch-sensitive display 102. A multi-touch-sensitive display 102 can, for example, process multiple simultaneous touch points, including processing data related to the pressure, degree, and/or position of each touch point. Such processing facilitates gestures and interactions with multiple fingers, chording, and other interactions. Other touch-sensitive display technologies can also be used, e.g., a display in which contact is made using a stylus or other pointing device. Some examples of multi-touch-sensitive display technology are described in U.S. Pat. Nos. 6,323, 846, 6,570,557, 6,677,932, and 6,888,536, each of which is incorporated by reference herein in its entirety.

In some implementations, the mobile device 100 can display one or more graphical user interfaces on the touch-sensitive display 102 for providing the user access to various system objects and for conveying information to the user. In some implementations, the graphical user interface can include one or more display objects 104, 106. In the example shown, the display objects 104, 106 are graphic representations of system objects. Some examples of system objects include device functions, applications, windows, files, alerts, events, or other identifiable system objects.

Example Mobile Device Functionality

In some implementations, the mobile device 100 can implement multiple device functionalities, such as a telephony device, as indicated by a phone object 110; an e-mail device, as indicated by the e-mail object 112; a network data communication device, as indicated by the Web object 114; a Wi-Fi base station device (not shown); and a media processing device, as indicated by the media player object 116. In some implementations, particular display objects 104, e.g., the phone object 110, the e-mail object 112, the Web object 114, and the media player object 116, can be displayed in a menu bar 118. In some implementations, device functionalities can be accessed from a top-level graphical user interface, such as the graphical user interface illustrated in FIG. 1A. Touching one of the objects 110, 112, 114, or 116 can, for example, invoke corresponding functionality.

In some implementations, the mobile device 100 can implement network distribution functionality. For example, the functionality can enable the user to take the mobile device 100 and provide access to its associated network while traveling. In particular, the mobile device 100 can extend Internet access (e.g., Wi-Fi) to other wireless devices in the vicinity. For example, mobile device 100 can be configured as a base station for one or more devices. As such, mobile device 100 can grant or deny network access to other wireless devices.

In some implementations, upon invocation of device functionality, the graphical user interface of the mobile device 100 changes, or is augmented or replaced with another user interface or user interface elements, to facilitate user access to particular functions associated with the corresponding device functionality. For example, in response to a user touching the phone object 110, the graphical user interface of the touch-sensitive display 102 may present display objects related to various phone functions; likewise, touching of the email object 112 may cause the graphical user interface to present display objects related to various e-mail functions; touching the Web object 114 may cause the graphical user interface to present display objects related to various Web-surfing functions; and touching the media player object 116 may cause the graphical user interface to present display objects related to various media processing functions.

In some implementations, the top-level graphical user interface environment or state of FIG. 1A can be restored by pressing a button 120 located near the bottom of the mobile device 100. In some implementations, each corresponding device functionality may have corresponding "home" display objects displayed on the touch-sensitive display 102, and the graphical user interface environment of FIG. 1A can be restored by pressing the "home" display object.

In some implementations, the top-level graphical user interface can include additional display objects 106, such as a short messaging service (SMS) object 130, a calendar object 132, a photos object 134, a camera object 136, a calculator object 138, a stocks object 140, a weather object 142, a maps object 144, a notes object 146, a clock object 148, an address book object 150, and a settings object 152. Touching the SMS display object 130 can, for example, invoke an SMS messaging environment and supporting functionality; likewise, each selection of a display object 132, 134, 136, 138, 140, 142, 144, 146, 148, 150, and 152 can invoke a corresponding object environment and functionality.

Additional and/or different display objects can also be displayed in the graphical user interface of FIG. 1A. For example, if the device 100 is functioning as a base station for other devices, one or more "connection" objects may appear in the graphical user interface to indicate the connection. In some implementations, the display objects 106 can be configured by a user, e.g., a user may specify which display objects 106 are displayed, and/or may download additional applications or other software that provides other functionalities and corresponding display objects.

In some implementations, the mobile device 100 can include one or more input/output (I/O) devices and/or sensor devices. For example, a speaker 160 and a microphone 162 can be included to facilitate voice-enabled functionalities, such as phone and voice mail functions. In some implementations, an up/down button 184 for volume control of the speaker 160 and the microphone 162 can be included. The mobile device 100 can also include an on/off button 182 for a ring indicator of incoming phone calls. In some implementations, a loud speaker 164 can be included to facilitate hands-free voice functionalities, such as speaker phone functions. An audio jack 166 can also be included for use of headphones and/or a microphone.

In some implementations, a proximity sensor 168 can be included to facilitate the detection of the user positioning the mobile device 100 proximate to the user's ear and, in response, to disengage the touch-sensitive display 102 to prevent accidental function invocations. In some implementations, the touch-sensitive display 102 can be turned off to conserve additional power when the mobile device 100 is proximate to the user's ear.

Other sensors can also be used. For example, in some implementations, an ambient light sensor 170 can be utilized to facilitate adjusting the brightness of the touch-sensitive display 102. In some implementations, an accelerometer 172 can be utilized to detect movement of the mobile device 100, as indicated by the directional arrow 174. Accordingly, display objects and/or media can be presented according to a detected orientation, e.g., portrait or landscape. In some implementations, the mobile device 100 may include circuitry and sensors for supporting a location determining capability, such as that provided by the global positioning system (GPS) or other positioning systems (e.g., systems using Wi-Fi access points, television signals, cellular grids, Uniform Resource Locators (URLs)). In some implementations, a positioning system (e.g., a GPS receiver) can be integrated into the mobile device 100 or provided as a separate device that can be coupled to the mobile device 100 through an interface (e.g., port device 190) to provide access to location-based services.

In some implementations, a port device 190, e.g., a Universal Serial Bus (USB) port, or a docking port, or some other wired port connection, can be included. The port device 190 can, for example, be utilized to establish a wired connection to other computing devices, such as other communication devices 100, network access devices, a personal computer, a printer, a display screen, or other processing devices capable of receiving and/or transmitting data. In some implementations, the port device 190 allows the mobile device 100 to synchronize with a host device using one or more protocols, such as, for example, the TCP/IP, HTTP, UDP and any other known protocol. In some implementations, a TCP/IP over USB protocol can be used, as described in U.S. Provisional Patent Application No. 60/945,904, filed Jun. 22, 2007, for "Multiplexed Data Stream Protocol,", which provisional patent application is incorporated by reference herein in its entirety.

The mobile device 100 can also include a camera lens and sensor 180. In some implementations, the camera lens and sensor 180 can be located on the back surface of the mobile device 100. The camera can capture still images and/or video.

The mobile device 100 can also include one or more wireless communication subsystems, such as an 802.11b/g communication device 186, and/or a Bluetooth™ communication device 188. Other communication protocols can also be supported, including other 802.x communication protocols (e.g., WiMax, Wi-Fi, 3G), code division multiple access (CDMA), global system for mobile communications (GSM), Enhanced Data GSM Environment (EDGE), etc.

Example Mobile Device

Figure 1B:
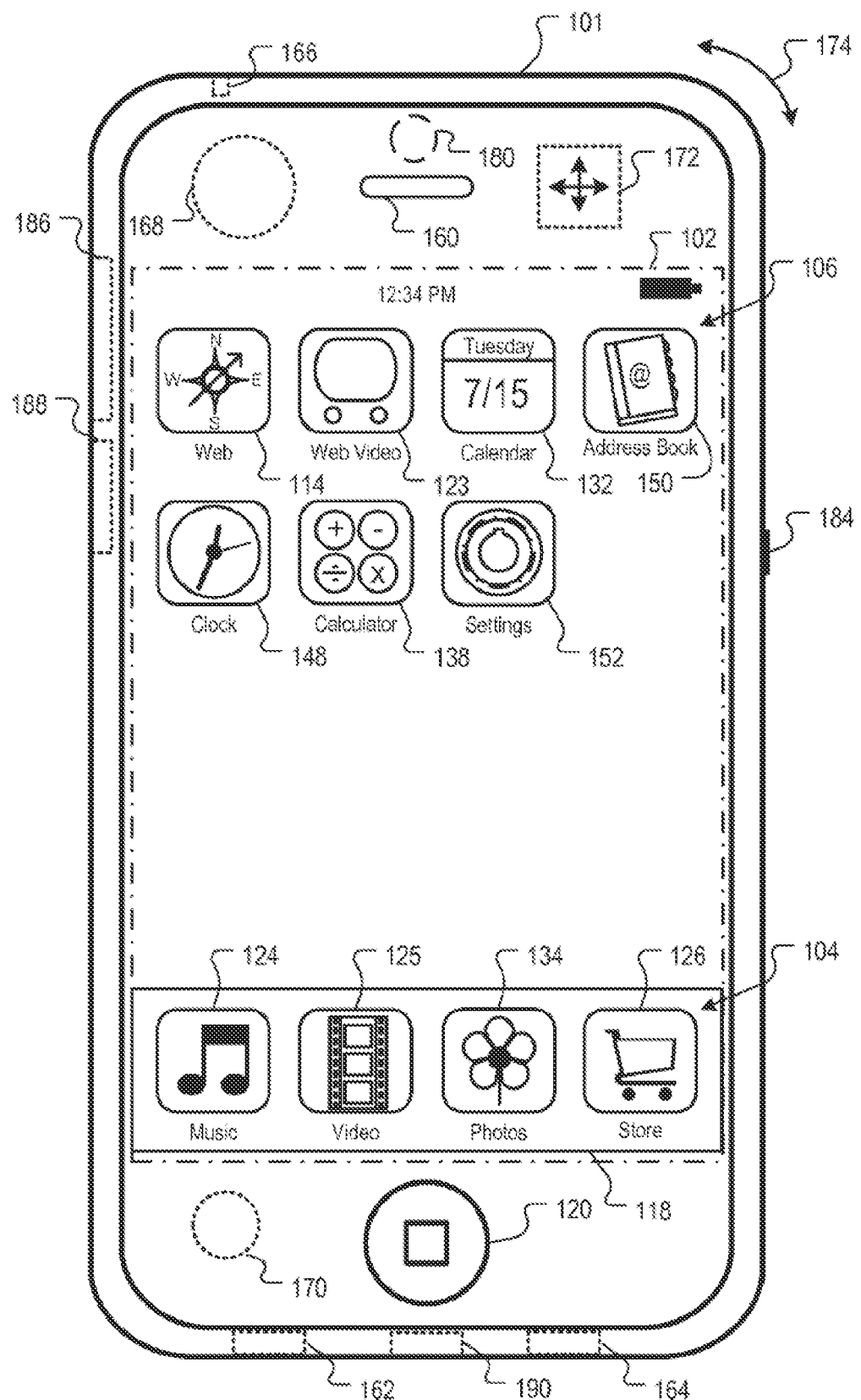
FIG. 1B is a block diagram of an example mobile device.

FIG. 1B is a block diagram of an example mobile device 101. The mobile device 101 can be, for example, a handheld computer, a personal digital assistant, a network appliance, a camera, a network base station, a media player, a navigation device, an email device, a game console, or a combination of any two or more of these data processing devices or other data processing devices. In some implementations, device 101 shown in FIG. 1B is an example of how device 100 can be configured to display a different set of objects. In some implementations, device 101 has a different set of device functionalities than device 100 shown in FIG. 1A, but otherwise operates in a similar manner to device 100.

Mobile Device Overview

In some implementations, the mobile device 101 includes a touch-sensitive display 102, which can be sensitive to haptic and/or tactile contact with a user. In some implementations, the mobile device 101 can display one or more graphical user interfaces on the touch-sensitive display 102 for providing the user access to various system objects and for conveying information to the user.

Mobile Device Functionality

In some implementations, the mobile device 101 can implement multiple device functionalities, such as a music processing device, as indicated by the music player object 124, a video processing device, as indicated by the video player object 125, a digital photo album device, as indicated by the photos object 134, and a network data communication device for online shopping, as indicated by the store object 126. In some implementations, particular display objects 104, e.g., the music player object 124, the video player object 125, the photos object 134, and store object 126, can be displayed in a menu bar 118. In some implementations, device functionalities can be accessed from a top-level graphical user interface, such as the graphical user interface illustrated in FIG. 1B. Touching one of the objects 124, 125, 134, or 126 can, for example, invoke corresponding functionality.

In some implementations, the top-level graphical user interface of mobile device 101 can include additional display objects 106, such as the Web object 114, the calendar object 132, the address book object 150, the clock object 148, the calculator object 138, and the settings object 152 described above with reference to mobile device 100 of FIG. 1A. In some implementations, the top-level graphical user interface can include other display objects, such as a Web video object 123 that provides functionality for uploading and playing videos on the Web. Each selection of a display object 114, 123, 132, 150, 148, 138, and 152 can invoke a corresponding object environment and functionality.

Additional and/or different display objects can also be displayed in the graphical user interface of FIG. 1B. In some implementations, the display objects 106 can be configured by a user. In some implementations, upon invocation of device functionality, the graphical user interface of the mobile device 101 changes, or is augmented or replaced with another user interface or user interface elements, to facilitate user access to particular functions associated with the corresponding device functionality.

In some implementations, the mobile device 101 can include one or more input/output (I/O) devices 160, 162, 164, and 166, a volume control device 184, sensor devices 168, 170, 172, and 180, wireless communication subsystems 186 and 188, and a port device 190 or some other wired port connection described above with reference to mobile device 100 of FIG. 1A.

Network Operating Environment

Figure 2:
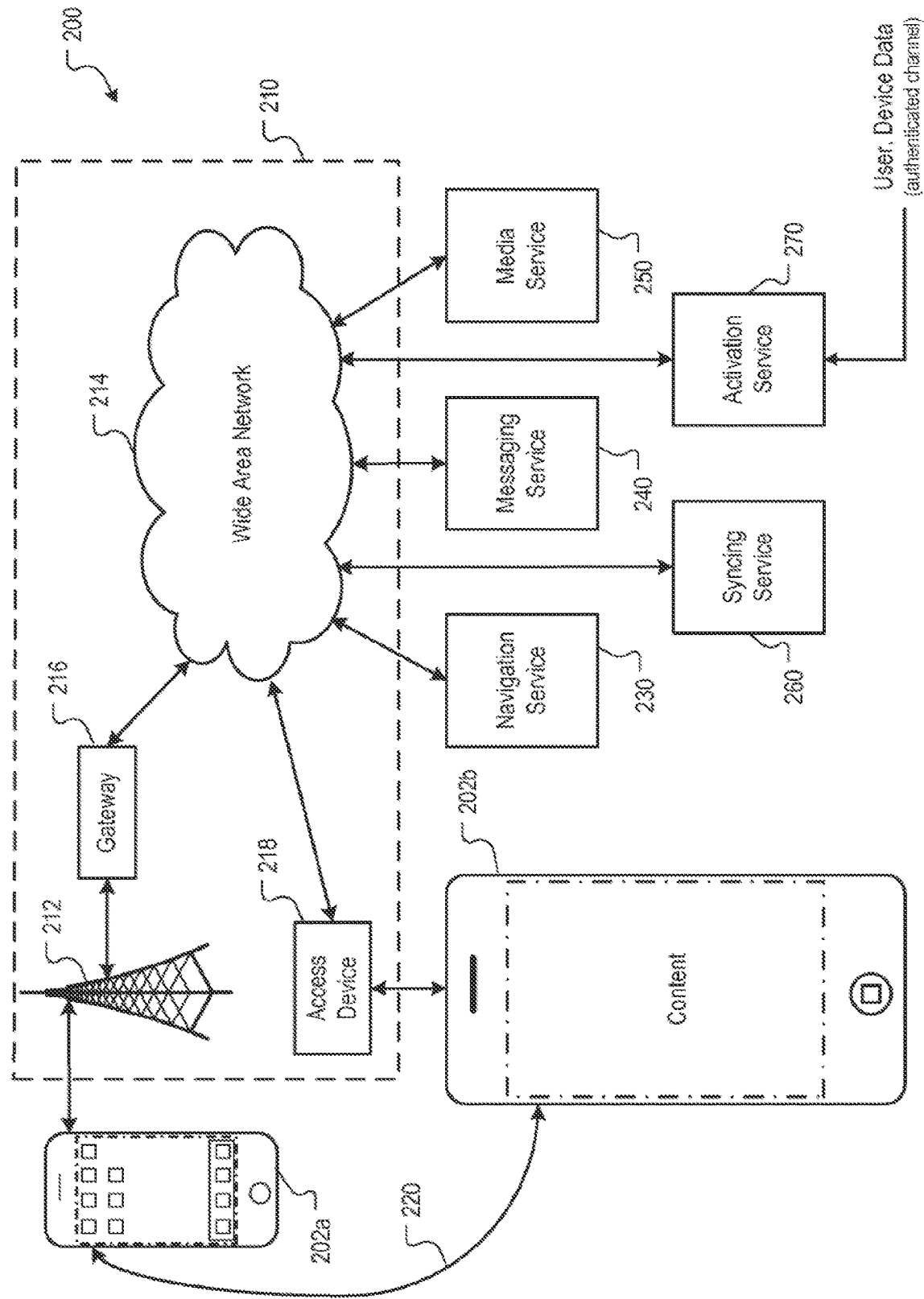
FIG. 2 is a block diagram of an example network operating environment for the mobile devices of FIGS. 1A-1B.

FIG. 2 is a block diagram of an example network operating environment 200. In FIG. 2, mobile devices 202a and 202b each can represent mobile device 100 or 101. Mobile devices 202a and 202b can, for example, communicate over one or more wired and/or wireless networks 210 in data communication. For example, a wireless network 212, e.g., a cellular network, can communicate with a wide area network (WAN) 214, such as the Internet, by use of a gateway 216. Likewise, an access device 218, such as an 802.11g wireless access device, can provide communication access to the wide area network 214. In some implementations, both voice and data communications can be established over the wireless network 212 and the access device 218. For example, the mobile device 202a can place and receive phone calls (e.g., using VoIP protocols), send and receive e-mail messages (e.g., using POP3 protocol), and retrieve electronic documents and/or streams, such as web pages, photographs, and videos, over the wireless network 212, gateway 216, and wide area network 214 (e.g., using TCP/IP or UDP protocols). Likewise, in some implementations, the mobile device 202b can place and receive phone calls, send and receive e-mail messages, and retrieve electronic documents over the access device 218 and the wide area network 214. In some implementations, the mobile device 202a or 202b can be physically connected to the access device 218 using one or more cables and the access device 218 can be a personal computer. In this configuration, the mobile device 202a or 202b can be referred to as a "tethered" device.

The mobile devices 202a and 202b can also establish communications by other means. For example, the wireless device 202a can communicate with other wireless devices, e.g., other mobile devices 202a or 202b, cell phones, etc., over the wireless network 212. Likewise, the mobile devices 202a and 202b can establish peer-to-peer communications 220, e.g., a personal area network, by use of one or more communication subsystems, such as the Bluetooth™ communication devices 188 shown in FIGS. 1A-1B. Other communication protocols and topologies can also be implemented.

The mobile device 202a or 202b can, for example, communicate with one or more services 230, 240, 250, 260, and 270 over the one or more wired and/or wireless networks 210. For example, a navigation service 230 can provide navigation information, e.g., map information, location information, route information, and other information, to the mobile device 202a or 202b. A user of the mobile device 202b can invoke a map functionality, e.g., by pressing the maps object 144 on the top-level graphical user interface shown in FIG. 1A, and can request and receive a map for a particular location.

A messaging service 240 can, for example, provide e-mail and/or other messaging services. A media service 250 can, for example, provide access to media files, such as song files, audio books, movie files, video clips, and other media data. In some implementations, separate audio and video services (not shown) can provide access to the respective types of media files. A syncing service 260 can, for example, perform syncing services (e.g., sync files). An activation service 270 can, for example, perform an activation process for activating the mobile device 202a or 202b. Other services can also be provided, including a software update service that automatically determines whether software updates exist for software on the mobile device 202a or 202b, then downloads the software updates to the mobile device 202a or 202b where the software updates can be manually or automatically unpacked and/or installed.

The mobile device 202a or 202b can also access other data and content over the one or more wired and/or wireless networks 210. For example, content publishers, such as news sites, RSS feeds, web sites, blogs, social networking sites, developer networks, etc., can be accessed by the mobile device 202a or 202b. Such access can be provided by invocation of a web browsing function or application (e.g., a browser) in response to a user touching the Web object 114.

Example Mobile Device Architecture

Figure 3:
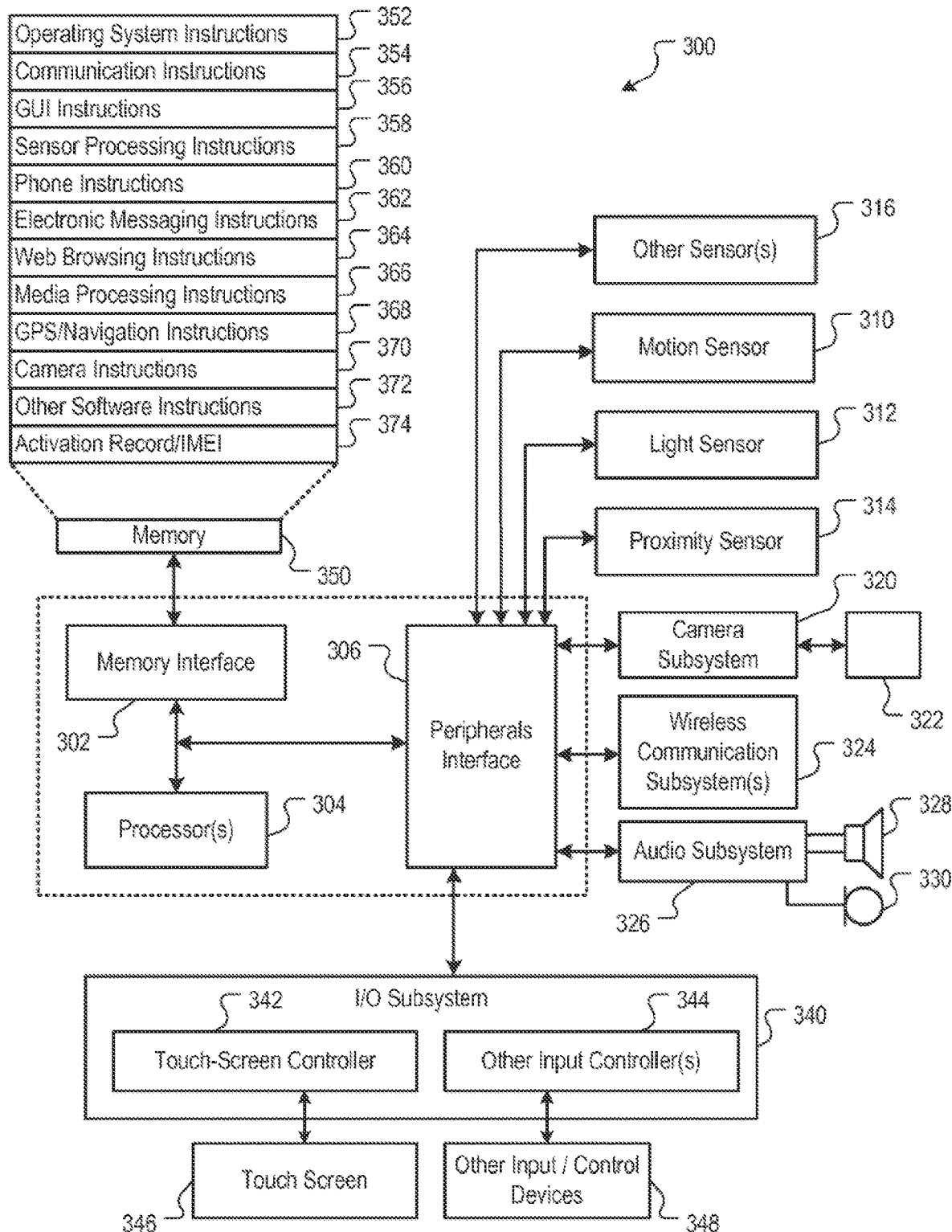
FIG. 3 is a block diagram of an example implementation of the mobile devices of FIGS. 1A-1B.

FIG. 3 is a block diagram 300 of an example implementation of the mobile devices 100 and 101 of FIGS. 1A-1B, respectively. The mobile device 100 or 101 can include a memory interface 302, one or more data processors, image processors and/or central processing units 304, and a peripherals interface 306. The memory interface 302, the one or more processors 304 and/or the peripherals interface 306 can be separate components or can be integrated in one or more integrated circuits. The various components in the mobile device 100 or 101 can be coupled by one or more communication buses or signal lines.

Sensors, devices, and subsystems can be coupled to the peripherals interface 306 to facilitate multiple functionalities. For example, a motion sensor 310, a light sensor 312, and a proximity sensor 314 can be coupled to the peripherals interface 306 to facilitate the orientation, lighting, and proximity functions described with respect to FIG. 1A. Other sensors 316 can also be connected to the peripherals interface 306, such as a positioning system (e.g., GPS receiver), a temperature sensor, a biometric sensor, or other sensing device, to facilitate related functionalities.

A camera subsystem 320 and an optical sensor 322, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 324, which can include radio frequency receivers and transmitters and/or optical (e.g., infrared) receivers and transmitters. The specific design and implementation of the communication subsystem 324 can depend on the communication network(s) over which the mobile device 100 or 101 is intended to operate. For example, a mobile device 100 or 101 may include communication subsystems 324 designed to operate over a GSM network, a GPRS network, an EDGE network, a Wi-Fi or WiMax network, and a Bluetooth™ network. In particular, the wireless communication subsystems 324 may include hosting protocols such that the device 100 or 101 may be configured as a base station for other wireless devices.

An audio subsystem 326 can be coupled to a speaker 328 and a microphone 330 to facilitate voice-enabled functions, such as voice recognition, voice replication, digital recording, and telephony functions.

The I/O subsystem 340 can include a touch screen controller 342 and/or other input controller(s) 344. The touch-screen controller 342 can be coupled to a touch screen 346. The touch screen 346 and touch screen controller 342 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 346.

The other input controller(s) 344 can be coupled to other input/control devices 348, such as one or more buttons, rocker switches, thumb-wheel, infrared port, USB port, and/or a pointer device such as a stylus. The one or more buttons (not shown) can include an up/down button for volume control of the speaker 328 and/or the microphone 330.

In one implementation, a pressing of the button for a first duration may disengage a lock of the touch screen 346; and a pressing of the button for a second duration that is longer than the first duration may turn power to the mobile device 100 or 101 on or off. The user may be able to customize a functionality of one or more of the buttons. The touch screen 346 can, for example, also be used to implement virtual or soft buttons and/or a keyboard.

In some implementations, the mobile device 100 or 101 can present recorded audio and/or video files, such as MP3, AAC, and MPEG files. In some implementations, the mobile device 100 or 101 can include the functionality of an MP3 player, such as an iPod™. The mobile device 100 or 101 may, therefore, include a 36-pin connector that is compatible with the iPod. Other input/output and control devices can also be used.

The memory interface 302 can be coupled to memory 350. The memory 350 can include high-speed random access memory and/or non-volatile memory, such as one or more magnetic disk storage devices, one or more optical storage devices, and/or flash memory (e.g., NAND, NOR). The memory 350 can store an operating system 352, such as Darwin, RTXC, LINUX, UNIX, OS X, WINDOWS, or an embedded operating system such as VxWorks. The operating system 352 may include instructions for handling basic system services and for performing hardware dependent tasks. In some implementations, the operating system 352 can be a kernel (e.g., UNIX kernel), as described in reference to FIG. 4.

The memory 350 may also store communication instructions 354 to facilitate communicating with one or more additional devices, one or more computers and/or one or more servers. The memory 350 may include graphical user interface instructions 356 to facilitate graphic user interface processing; sensor processing instructions 358 to facilitate sensor-related processing and functions; phone instructions 360 to facilitate phone-related processes and functions; electronic messaging instructions 362 to facilitate electronic-messaging related processes and functions; web browsing instructions 364 to facilitate web browsing-related processes and functions; media processing instructions 366 to facilitate media processing-related processes and functions; GPS/Navigation instructions 368 to facilitate GPS and navigation-related processes and instructions; camera instructions 370 to facilitate camera-related processes and functions; and/or other software instructions 372 to facilitate other processes and functions, e.g., security processes and functions as described in reference to FIG. 4. The memory 350 may also store other software instructions (not shown), such as web video instructions to facilitate web video-related processes and functions; and/or web shopping instructions to facilitate web shopping-related processes and functions. In some implementations, the media processing instructions 366 are divided into audio processing instructions and video processing instructions to facilitate audio processing-related processes and functions and video processing-related processes and functions, respectively. An activation record and International Mobile Equipment Identity (IMEI) 374 or similar hardware identifier can also be stored in memory 350.

Each of the above identified instructions and applications can correspond to a set of instructions for performing one or more functions described above. These instructions need not be implemented as separate software programs, procedures, or modules. The memory 350 can include additional instructions or fewer instructions. Furthermore, various functions of the mobile device 100 or 101 may be implemented in hardware and/or in software, including in one or more signal processing and/or application specific integrated circuits.

Software Stack and Security Process

Figure 4:
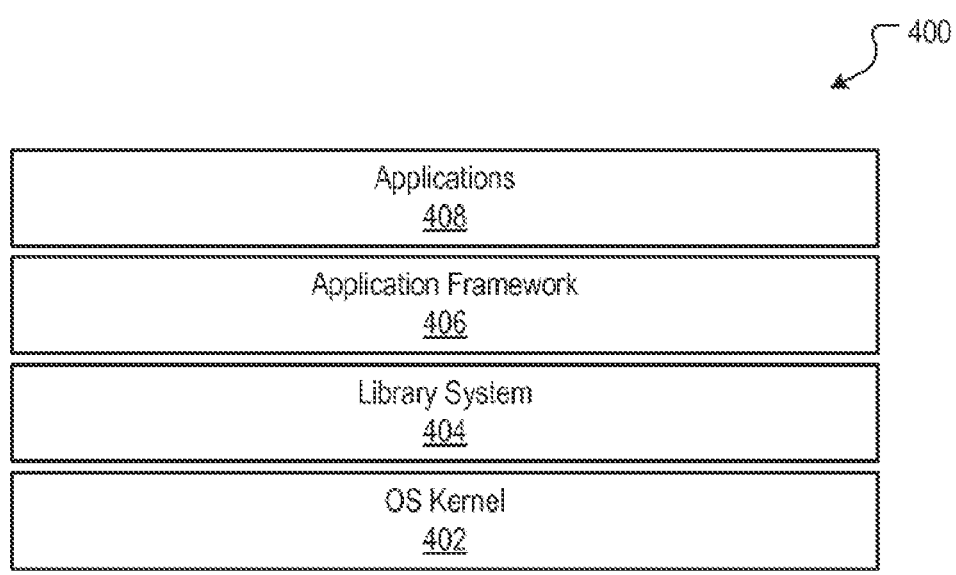
FIG. 4 illustrates an example implementation of a software stack for the mobile devices of FIGS. 1A-1B.

FIG. 4 illustrates an example implementation of a software stack 400 for the mobile devices of FIGS. 1A-1B. In some implementations, the software stack 400 includes an operating system (OS) kernel 402 (e.g., a UNIX kernel), a library system 404, an application framework 406, and an applications layer 408.

The OS kernel 402 manages the resources of the mobile device 100 or 101 and allows other programs to run and use these resources. Some examples of resources include a processor, memory, and I/O. For example, the kernel 402 can determine which running processes should be allocated to a processor, processors or processor cores, allocates memory to the processes and allocates requests from applications and remote services to perform I/O operations. In some implementations, the kernel 402 provides methods for synchronization and inter-process communications with other devices.

In some implementations, the kernel 402 can be stored in non-volatile memory of the mobile device 100 or 101. When the mobile device 100 or 101 is turned on, a boot loader starts executing the kernel 402 in supervisor mode. The kernel then initializes itself and starts one or more processes for the mobile device 100 or 101, including a security process for remote access management.

The library system 404 provides various services for applications running in the application layer 408. Such services can include audio services, video services, database services, image processing services, graphics services, etc.

The application framework 406 provides an object-oriented application environment including classes and Application Programming Interfaces (APIs) that can be used by developers to build applications using well-known programming languages (e.g., Objective-C, Java).

The applications layer 408 is where various applications exist in the software stack 400. Developers can use the APIs and environment provided by the application framework 406 to build applications, such as the applications represented by the display objects 104, 106, shown in FIGS. 1A-1B (e.g., email, media player, Web browser, phone, music player, video player, photos, and store).

Locked/Unlocked HUD Interface

Figure 5:
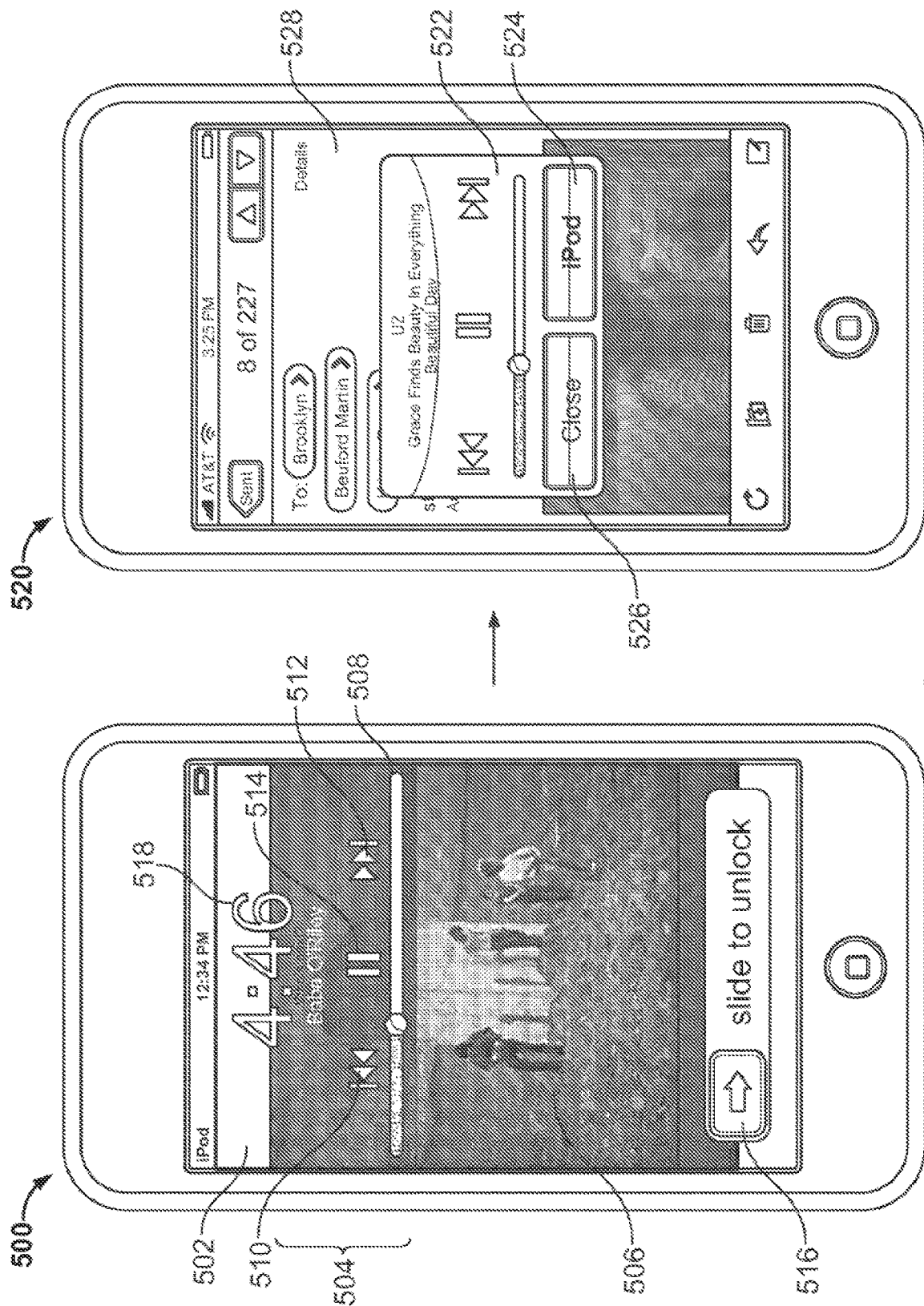
FIG. 5 is a set of screen shots depicting example user interface content on a mobile device.

FIG. 5 is a set of screen shots depicting examples of user interface content on a mobile device. A first example user interface 500 includes a touch-sensitive display 502 for providing a user access to various system objects and for conveying information to the user. In some implementations, the user can navigate to interface 500 by selecting a display object, such as media object 116 or music object 124 on device 100 and device 101, respectively. In some implementations, the user can navigate to interface 500 by selecting (e.g., double-tapping) a hardware control, such as button 120 on device 100 or 101, for example. Other methods for entering the interface 500 can be possible, a few of which will be described below.

The user interface 500 can display a view of an audio application which can generally execute (e.g., play back) audio files such as songs, movies, podcasts, or other media stored in the memory of or accessed by device 100 or 101. In particular, the user interface 500 can display a heads-up display (HUD) audio interface 504 overlaid on a background image 506. In some implementations, the background image 506 can correspond to an audio track on the mobile device such as an album graphic or music video. In other implementations, the background image can correspond to an application running on the device, such as a browser application, an email application, or a phone application, to name a few examples.

The HUD audio interface 504 can be a transparent or partially transparent display that presents data without obstructing the user's view of background image 506. For example, the interface 504 can be an audio interface displayed as an overlay to a user's current view displayed in interface 500. As such, the HUD audio interface 504 can be used to simultaneously present various user interface elements in the display of device 100 or 101, for example. The user interface elements can include controls, images, or information, for example, time, date, program information, text, or other device information. As shown, the HUD audio interface 504 includes the following user interface elements: a volume slide control 508, a reverse track control 510, a forward track control 512, and a pause/play control 514. In general, the user can use any or all of the user interface elements for changing the playing of one or more audio files.

In an example operational mode, the user can select and slide an indicator of the volume slide control 508 to change the volume level of the device 100 or 101 for a particular audio file playing on the device, e.g., from a playlist. A playlist can generally include a list of audio files a user has configured to play consecutively or randomly. As such, when a user selects a playlist, the audio files can be queued for play in device 100 or 101.

The user can also select the reverse track control 510 to skip backward to a different point in an audio file. Similarly, the user can select the forward track control 512 to skip forward to a different point in an audio file. In some implementations, the reverse track control 510 and the forward track control 512 can be used to skip backward or forward, respectively, in an audio file playlist, artist list, song list, or other audio related list stored in device memory. The user can also select the pause/play control 514 to pause or play a selected audio file. In some implementations, a stop button (not shown) can also be selected to stop playing a particular audio file. In some implementations, the objects in the interface 500 may not be selectable until the user unlocks a locking control 516, for example.

As shown, the touch-sensitive display 502 includes the locking control 516. As shown, the control 516 is in a locked position and the device 100 or 101 can be locked until the user slides the control 516 to unlock, or alternatively, uses another unlocking mechanism (e.g., hardware buttons, reboot, etc.). In some implementations, the user can choose to lock or unlock the touch-sensitive display 502 during use. For example, the user can slide locking control 516 into lock mode, e.g., when listening to audio on the device while jogging or when placing the device in a bag, to avoid unintentionally providing input to the touch-sensitive display 502. In some implementations, when the device is in lock mode, the user can trigger the display of the HUD audio interface 504 by selecting (e.g., double-tapping) a hardware control, for example, button 120 on device 100 or 101. If the elements of the HUD audio interface 504 are disabled when the lock control 516 is engaged, the user can slide the locking control 516 to an unlock state to modify volume or change a song, for example. In some implementations, the locking control 516 can display directions for the user. For example, the locking control 516 shown in interface 500 includes a "slide to unlock" instruction that visually instructs the user on how to use the control 516. In some implementations, fewer interface elements are provided by the HUD audio interface 504 when the locking control 516 is engaged than the number of interface elements provided by a HUD audio interface when the locking control 516 is disengaged.

As shown in interface 500, the HUD audio interface 504 includes a time display 518 that can display the current time of day, for example. The HUD audio interface 504 can also include now playing information (shown here as a song named "Baba O'Riley"), next playing information (not shown), previously played audio (not shown), audio track lengths (not shown), and other audio information, for example.

In some implementations, upon invocation of particular device functionality, the graphical user interface 500 can be changed or replaced with another user interface or user interface elements, to facilitate user access to functions associated with the corresponding invoked device functionality. As an example, in response to a user sliding the locking control 516, the touch-sensitive display 502 can be unlocked, and a new view can be presented in the user interface. The new view may include a different interface, for example, interface 520. The interface 520 depicts a HUD audio interface 522 with display elements related to various audio functions. Similar to HUD audio interface 504, the HUD audio interface 522 includes audio controls for volume, fast forward, rewind, and play/pause. Additional information can be shown in the HUD audio interface 522, such as a current song (generally in play). In this example, the current song is displayed as "Grace Finds Beauty In Everything" from the band "U2" on the album "Beautiful Day." In some implementations, more or less information can be shown about the current song. In addition, the HUD audio interface 522 provides the user with the option to enter "iPod" mode by selecting an iPod button 524 to select other albums, songs, or media. For example, if the user selects iPod button 524, the user interface 520 can present an MP3/video library or other audio related selection within the device. The user interface 520 may include various artists, songs, videos, and other media selectable for play or view in the user interface 520. In addition, the unlocked user interface 520 can allow the user to interact with any or all device options.

In some implementations, while the device in an unlocked mode, the user can select a close button 526 on the HUD audio interface 522. Selection of the close button 526 can trigger the device 100 or 101 to exit the HUD audio interface 522 and return the user to a home screen or a previous screen 528. For example, the previous screen 528 can include an email application as shown in FIG. 5 shadowed behind HUD audio interface 522. In some implementations, the previous screen 528 may represent the screen that was displayed in the device before the HUD audio interface 522 was invoked, for example. Here, the user may have been reading or composing email when deciding to invoke the audio interface. In another scenario, the user may have been composing email while listening to audio on the device and may wish to change (or switch to) the audio interface at some point. The user can then change the audio output by performing a preset action (e.g., double-tapping a hardware or software control, selecting an audio icon, etc.). In some implementations, the user action can trigger the display of a new user interface overlaid on the current interface or replacing the current interface.

In some implementations, the new user interface can include an audio application view (e.g., the example view in user interface 500). For example, in response to a user-entered action, the device can display the audio application view of interface 500. The audio application view can include images or other information associated with a particular audio file including, but not limited to, a performer, a song, an album, a track number, an elapsed time, a remaining time, album art, text, menus, or other graphics and controls. In some implementations, the audio file information shown in an audio application view or in a HUD audio interface can include a link to a resource where the audio file is accessible. For example, the link can be a URL for an internet radio website, and selection of the link can direct the user to the website, e.g., in a browser application on the device. The link may point to more information about the audio file such as album data, album reviews, performer interviews, and more. Selecting such a link can display content about the audio file and other information available from the resource.

In some implementations, the user may invoke the display of interface 500, interface 520, or another interface upon performing a similar action. For example, if the user double-taps hardware button 120, for example, he or she may be presented with a user interface such as interface 500, interface 520, or another interface. In particular, the same action can bring the user to a number of different user interfaces based on the context of the device 100 or 101, or the state of the current user interface, for example.

In some implementations, the user interface presented upon user selection of an object or button may depend upon the context of the device 100 or 101. For example, if the user is using the phone application and double-taps button 120, an address book user interface may be presented, for example, to assist the user with finding a phone number. Similarly, if the user is using the camera functionality, a double-tap to button 120 can present a user interface for directing the user to a storage location for a captured photograph, for example. In yet another alternative, if the user is using the audio player, a double-tap to button 120 can open or close an audio interface such as the HUD audio interface of interface 500 or interface 520. For example, the user may be composing email and can double-tap button 120 to be presented with an audio interface. In this example, the interface 520 can display the HUD audio interface 522 over the view of the email application. Using the HUD audio interface 522, the user can change the state of the audio player (e.g., change a song, volume, or other setting).

In some implementations, the user interface presented upon user selection of an object or button may depend upon the current state of one or more user interface elements, e.g., a slider, a button, or a dial. For example, when the locking control 516 is engaged, the HUD audio interface 504 is presented upon user selection of (e.g., double-tapping) button 120. In another scenario, if the locking control 516 is disengaged, user selection of button 120 may trigger the display of a different interface, for example, an interface with additional interface elements not provided with the HUD audio interface 504. In FIG. 5, the locked state of the touch-sensitive display 502 may have been set by the user and may remain until a user interaction changes the state. As such, the user may unlock the touch-sensitive display 502 and then use the HUD audio interface 504 to change one or more settings of the audio player.

In some implementations, the user can specify the result of selecting (e.g., doubled-tapping) a button or control through a preference menu. For example, the user can specify which user interface is displayed when selecting button 120 while using various applications. More specifically, the user can use a preference menu to configure software and hardware control behavior while using each application, including the presentation of one or more types of user interfaces. For example, a transparent user interface overlay can be presented if the user selects button 120 while composing text in an email, for example. In some implementations, a new user interface can replace a presently displayed user interface upon selection of the same button 120. For example, a new user interface can be displayed if the user selects button 120 after completing a phone call.

Context or State Specific Process

Figure 6A:
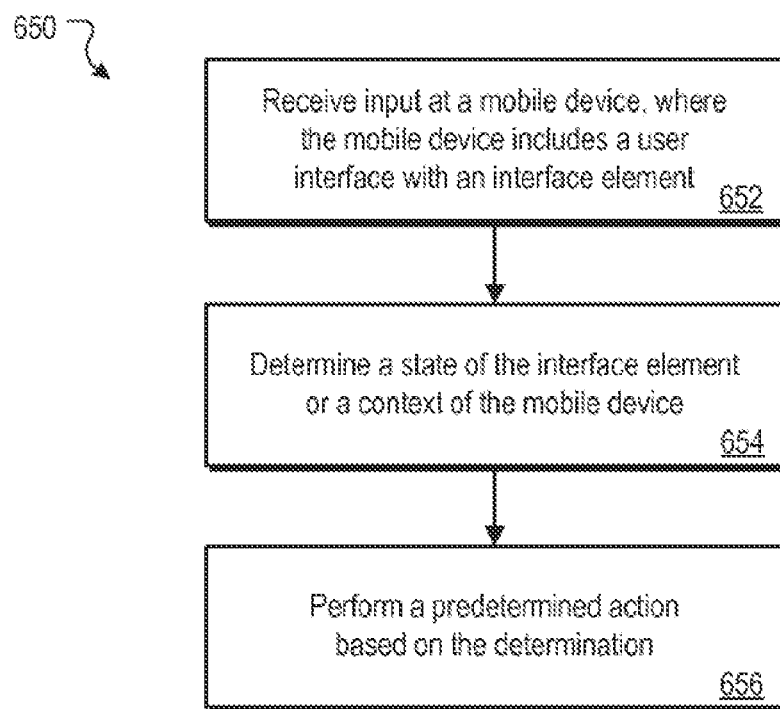
FIG. 6A illustrates an example process for performing a predetermined action on a mobile device based on the context of the mobile device or the state of an interface element.

FIG. 6A illustrates an example process 650 for performing a predetermined action on a mobile device based on the context of the mobile device or the state of an interface element of the mobile device. In some implementations, the method 650 can be used on mobile device 100 or 101.

The process 650 begins when input is received at a mobile device, where the mobile device includes a user interface with an interface element (652). Generally, a user interface includes multiple interface elements. In some implementations, the input is received from a user as a selection of an object or icon displayed on the mobile device. In other implementations, the input is a double-tap motion on a menu control or a hardware button. In other implementations, the input is gesture input provided to a multi-touch-sensitive display of the mobile device.

The state of the interface element or a context of the mobile device is determined (654). Interface element states can include, for example, an engaged locking control, a checked check box, or a selected menu button. The context of a mobile device can include, for example, a currently active application, a sleep mode, a lock mode, or an update mode.

In response to the received input, a predetermined action is performed based on the determination of the device context or the interface element state (656). In some implementations, the predetermined action can be the display of a particular interface (e.g., a HUD audio interface) on the mobile device. In other implementations, the predetermined action is the invocation of a particular application or feature. The particular interface displayed can be previously specified by a user selection, e.g., in a preference menu.

HUD Overlay Display Process

Figure 6B:
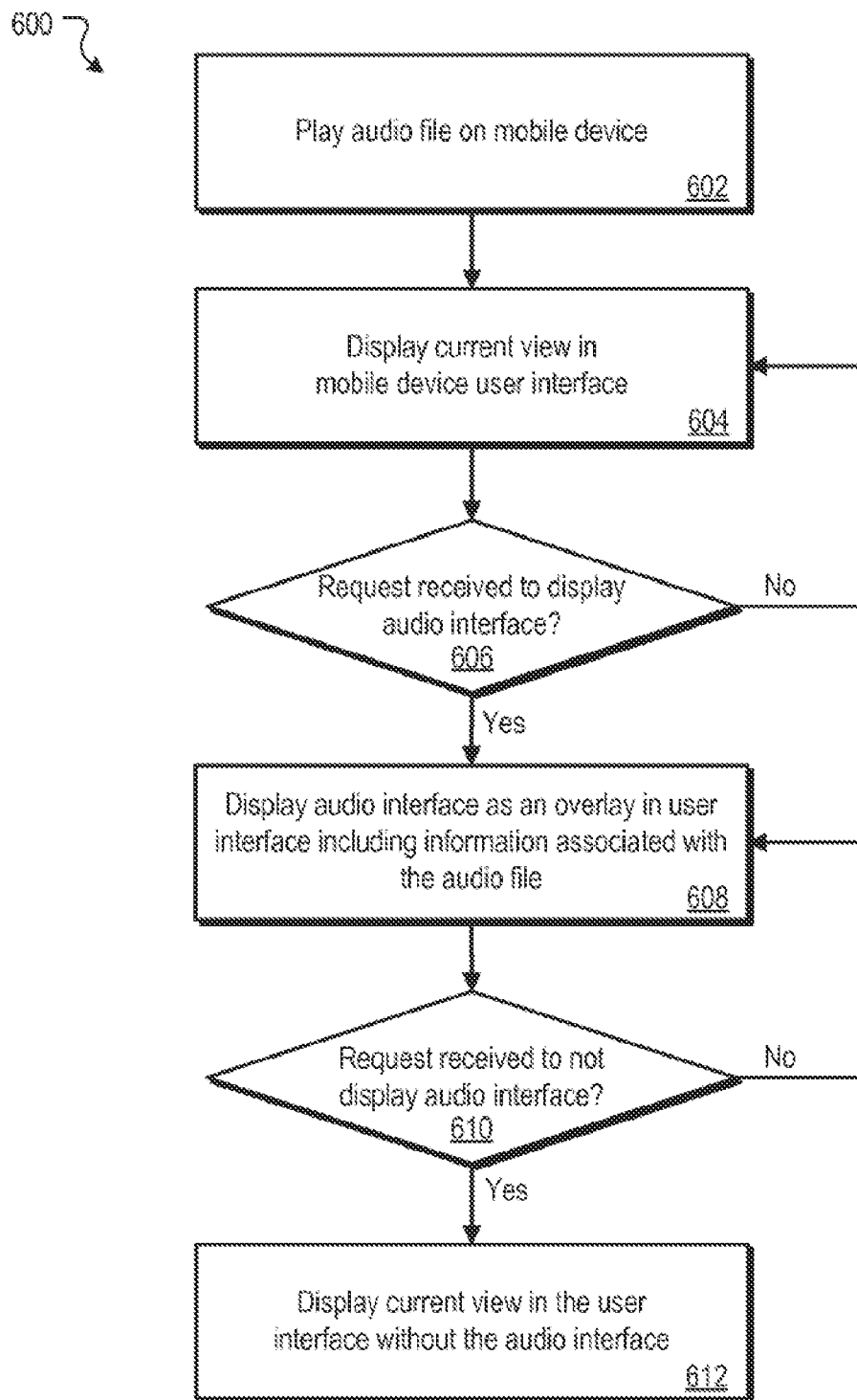
FIG. 6B illustrates an example process for presenting an overlay in a user interface on a mobile device.

FIG. 6B illustrates an example process 600 for presenting an overlay in a user interface on a mobile device. In some implementations, the method 600 can be used on mobile device 100 or 101. Generally, the process includes sending and receiving requests to modify or switch to one or more user interfaces on a mobile device.

The process 600 begins when a user of a mobile device selects a media or an audio object (e.g., the media player object 116 of device 100 or the music player object 124 of device 101) to execute an audio function, for example, to play an audio file (602). Alternatively, the user can invoke playback of one or more audio files through another icon or pre-programmed hardware control. During playback of the audio files, the user can use other interfaces on device 100 or 101. For example, the user can use other interfaces to compose email, schedule events, view photos or websites, or other tasks selectable on the mobile device. In some implementations, the user can interrupt audio play to use phone features, or other messaging features and return to audio play upon completion of a phone call/message. Although the audio interface may be running in the background, the user is generally using a "current view" to perform other tasks. As such, the current view is displayed in the user interface (604).

While playing an audio file on the mobile device and displaying an unrelated view in the user interface, the user can send a request to display the audio interface. The audio interface can generally include a "now playing" interface related to the audio track currently in playback. In some implementations, the user request may be a selection of an audio icon. In other implementations, the user request may be in the form of a double-tap motion on a particular menu control or a hardware button. In yet other implementations, the request may be in the form of a touch or gesture predetermined by the user to invoke particular device functionality (e.g., switch user interface functionality).

In some implementations, the mobile device can detect or perform a query to determine whether a user request to display an audio interface is received (606). If the user request is not received, the current view can remain in the user interface (e.g., user interface 500). However, if the request to display the audio interface is received in the system, the mobile device can display the audio interface as an overlay in the user interface, where the audio interface includes information associated with one or more audio files (608). For example, in response to the user double-tapping a hardware control button, a now playing interface (e.g., HUD audio interface 504) can be displayed as an overlay in the user interface (e.g., the graphical user interface 500). Further, the now playing interface can include information associated with the audio file, such as the name of a file or song, song length, album title, or album length, and audio controls, such as play, rewind, or forward.

While displaying the audio interface, the mobile device can detect or perform a query to determine whether a user request is received to hide or exit the audio interface. For example, the mobile device 100 or 101 can determine whether the user requested to minimize, hide, exit, or otherwise mask the audio interface. If the request is not received, the mobile device can continue to display the audio interface. If the request to not display the audio interface is received, the mobile device can return to displaying the current view in the user interface without the audio interface (612). For example, the audio interface may be hidden or minimized such that the user does not see the audio interface, but the audio player continues to function (i.e., the audio file is still in playback). In some implementations, the audio file may be paused rather than in playback when the audio interface is minimized, hidden, or closed.

In some implementations, the device 100 or 101 can be transitioned from one user interface to another according to user input or device programming. For example, when a user invokes an email application on device 100, an email user interface can be displayed on the device, and interfaces for other applications can be minimized, closed, or otherwise reduced in the display. As such, transition screens or interfaces can be presented between the changing of interfaces or applications. For example, device 100 or 101 can include animated transitions from displaying the "current" view in the user interface to displaying a "new" view in the user interface.

Various animation transition techniques can be used to present a change in the user interface. In general, the techniques can include gradual transitions from one image to another in the device display (i.e., one view to another view in the user interface). For example, one image can be replaced by another image with a distinct or blurry edge. The images described in this disclosure can be actual application content (e.g., email, audio, website, controls, or text), still images, text, and banners, for example. In some implementations, the transition shown between images can also include a transition between one application and another application. For example, device 100 or 101 can use one or more animated transitions to move from an email application view to an audio playback application view. In some implementations, the display of audio interfaces can also be animated along with any image, application, text, etc. The audio interface can remain transparent or partially transparent over any or all animated content and the interface elements of the audio interface can be enabled when animation completes. In some implementations, the audio interface can be transitioned before a background image is transitioned.

In some implementations, the transition animations occur gradually over a period of time. In other implementations, the transition animations occur immediately upon receiving a user request. For example, the image in the user interface can be faded, wiped, dissolved, cut away, or otherwise morphed into another image over time or instantaneously. In some implementations, one or more animation effects can be user-configured for each application, through a preference menu, for example.

FIGS. 7-12 show examples of animation effects used to transition from one view to another view in a user interface on the mobile device 100 or 101. The examples below generally include a set of screen shots that capture the animations at different points in time. However, the sequence of events depicted can be reversed when moving from right to left or bottom to top through the screens.

Shrink/Expand Animation

Figure 7:
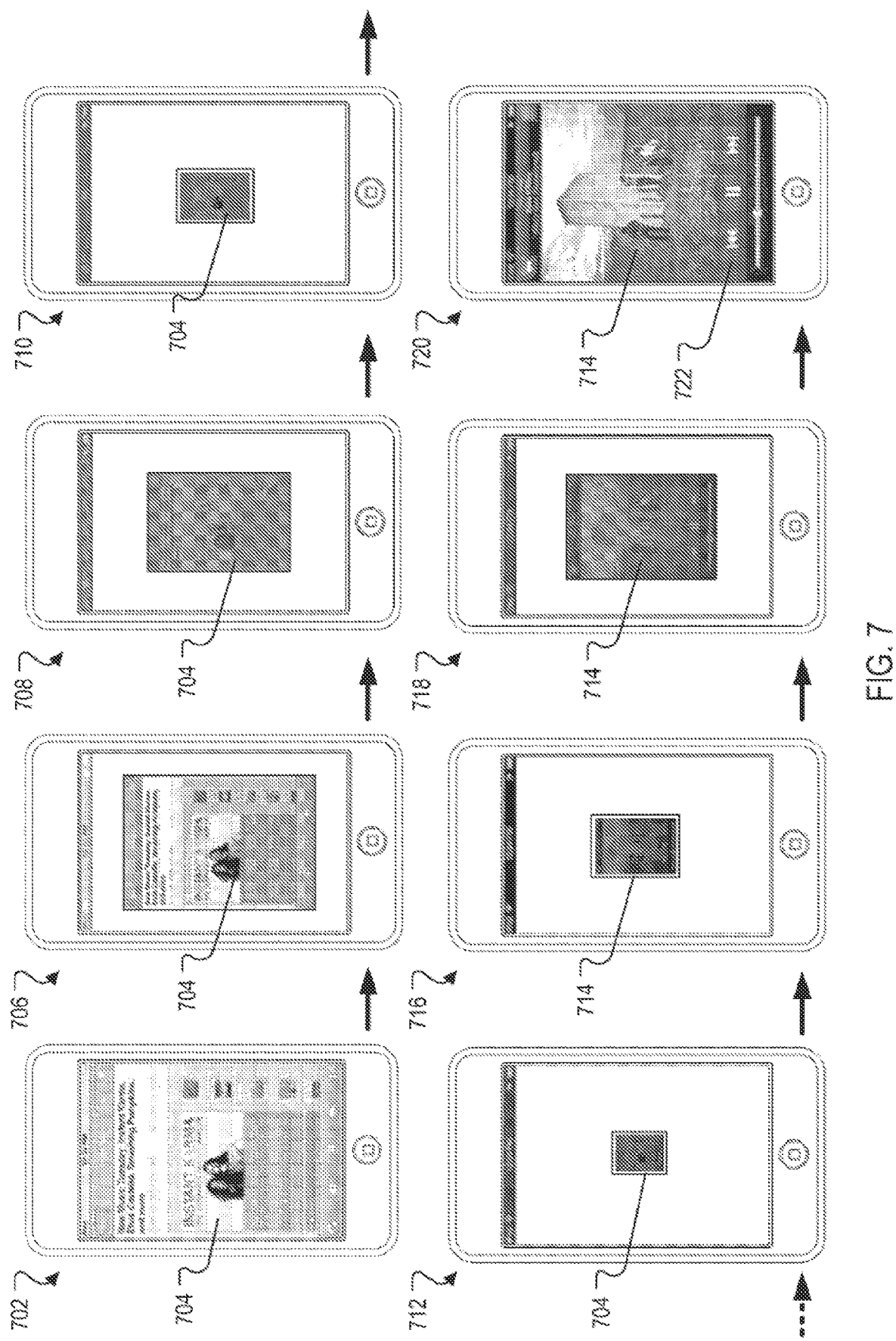
FIG. 7 is a sequence of screen shots depicting a shrink and expand animation effect on a mobile device.

FIG. 7 is a sequence of screen shots depicting a shrink and expand animation effect on a mobile device. In general, the shrink and expand animation effect can be applied to images, text, video, or other presentable content. In certain implementations, more or less screen content can be presented on the device between each screen shot. As such, the content shown in FIG. 7 is an example of the screen content that can be presented while using the mobile device.

The shrink and expand animation can include effects such as the shrinking of a current view in a user interface followed by an expanding of a new view in the user interface. In some implementations, the shrink and expand animation can occur upon user request. For example, the user can touch or provide input gesture to the device that a change in the user interface is desired. The user touch or gesture can include a double-tap of a control button to indicate that a change is desired in the user interface of screen shot 702, for example. In some implementations, the user touch or gesture can include selection of a hardware button, an icon, or other menu item.

In an example operational mode, the user indicated change can occur, for example, when the user is viewing application data, such as a webpage 704. In this example, the webpage 704 is shown in screen shot 702 and represents a news story accessed by the user. The user can generally utilize the webpage 704 or another application on the device until the user wishes to switch the content displayed in the user interface. For example, the user may use the webpage 704 and can decide, at some point, to switch to view an audio application view. The user can then invoke the audio application view with an audio interface by touching or providing gesture input to the screen to trigger the desired screen change (e.g., double-tapping a control button on the device). In response to the user touch or gesture, the display of the webpage image 704 can be transitioned through animation to display the requested audio application view. In some implementations, the animated transition can include gradually shrinking the webpage image 704 (shown in screen shot 702) over time until the image fades away. For example, the webpage image 704 is shown smaller in screen shot 706, smaller yet in screen shot 708, still smaller in screen shot 710, and finally barely visible in screen shot 712.

Upon reaching a certain image dissolution, the device can begin to present and expand a new interface image 714. The new image 714 is shown in screen shot 716 as a small view of an audio application. The animation continues by gradually expanding the new image 714 in screen shot 718 and finishes as a full sized image 714 in screen shot 720. In some implementations, an audio interface 722 can be animated in the user interface along with the audio application content. In this example, the audio interface 722 is present in screen shot 720 with interface elements selectable by the user. After the animated transition completes, the user can begin using the presented audio interface. In some implementations, the animated transition can incrementally fade (while shrinking) or brighten (while expanding) over time. In some implementations, the audio interface may be visible and usable before the animation effect is complete. In some implementations, the audio interface 722 is an overlay over the view of the audio application. In other implementations, the audio interface 722 is part of the audio application view.

Slide Animation

Figure 8:
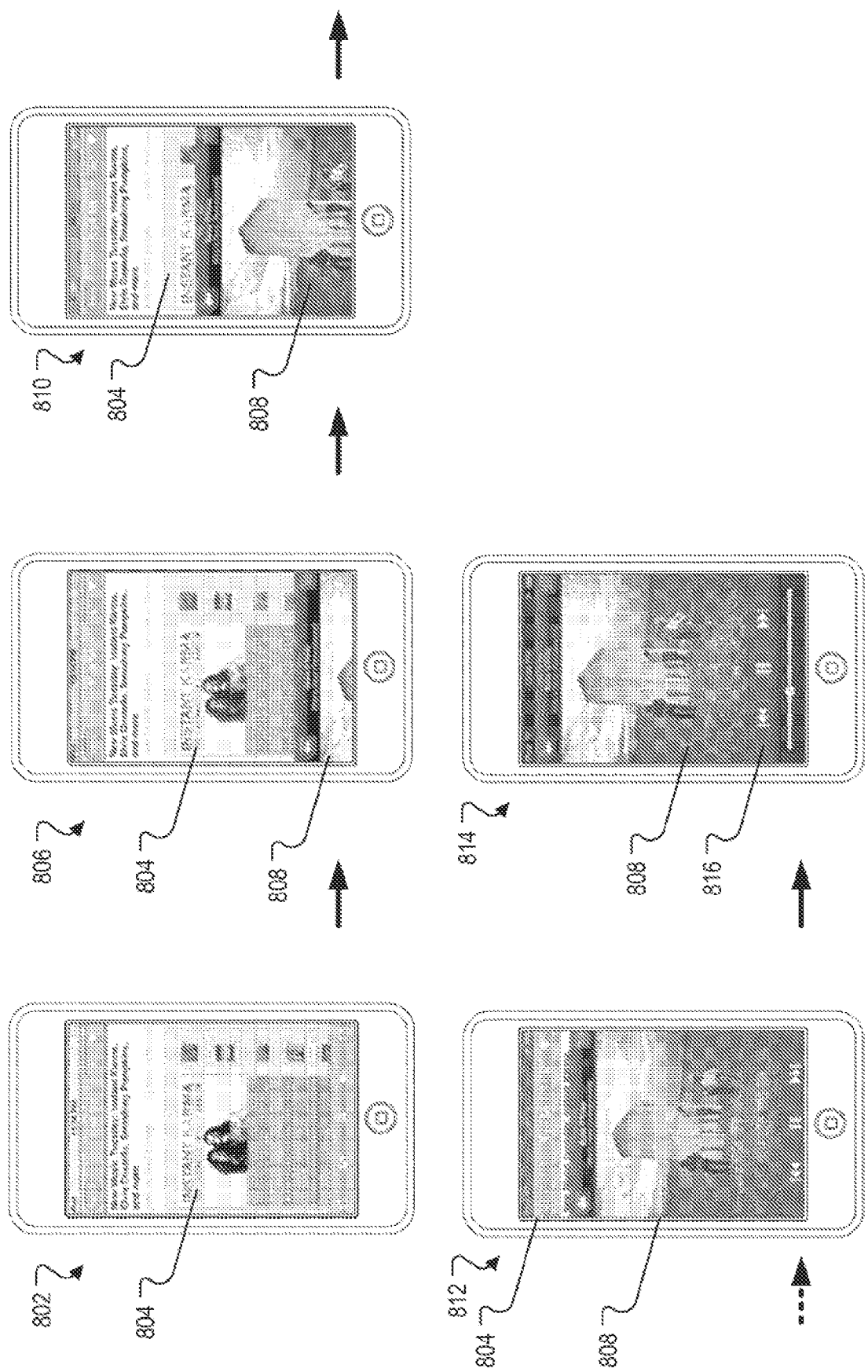
FIG. 8 is a sequence of screen shots depicting a slide animation effect on a mobile device.

FIG. 8 is a sequence of screen shots depicting a slide animation effect on a mobile device. The slide animation can include a sliding of a current user interface view off of a vertical edge of the user interface while sliding a new view from another vertical edge of the user interface. In some implementations, the sliding animation can occur upon user request. For example, the user can touch or provide input gesture to the device that a change in the user interface is desired. The user touch or gesture can include a double-tap of a control button to indicate that a change is desired in a user interface of screen shot 802, for example. In some implementations, the user touch or gesture can include selection of a hardware button, an icon, or other menu item.

In an example operational mode, a user may be viewing content in the user interface of screen shot 802. The content in this example is a webpage image 804. At some point, the user can request to view different content in the interface, such as an audio application view. As such, the user request can invoke the mobile device to switch to a display of the new user interface. For example, upon receiving the user request, the mobile device may begin the slide animation by shifting the webpage image 804 upward and eventually off the screen of the device.

As shown in screen shot 806, the slide animation begins to appear. For example, the webpage image 804 is shown sliding upward as a first portion of a new image 808 is presented in the device, for example. Over time, the webpage image 804 can slide further upward while a new image 808 slides upward below image 804 to replace image 804. More particularly, the new image 808 can slide upward at a similar rate to the rate the image 804 slides upward and thereby can replace the webpage image 804. In some implementations, the slide transition can be completed in less than a second.

As shown in screen shot 810, approximately half of each image 804 and 808 is displayed in the user interface of the device. In this animation, image 804 slides upward while image 808 slides to replace image 804 in a portion of the screen. A screen shot 812 displays a last portion of image 804 and a nearly full portion of image 808. A screen shot 814 displays the fully transitioned image 808 triggered by the user-entered request to change content. After the slide animation effect is completed, the interface of screen shot 814 depicts the image 808 as a view of an audio application selectable and usable by the user of the device. In some implementations, an audio interface (e.g., audio interface 816) appears as an overlay over the view of the audio application. In some implementations, the user may switch to the audio image 808 briefly to change a song in play and switch back to the initial webpage image 804 upon completion of the change song task. In a similar fashion, the user can switch to another task and back to the audio image 808, as desired.

In some implementations, the slide animation can occur horizontally or diagonally across the screen of the device. In certain implementations, the sliding animation effect can occur from left to right, right to left, upward, or downward.

In a similar fashion, the diagonal slide effect may occur corner to corner from any one of the corners of the device display.

Wipe Animation

Figure 9:
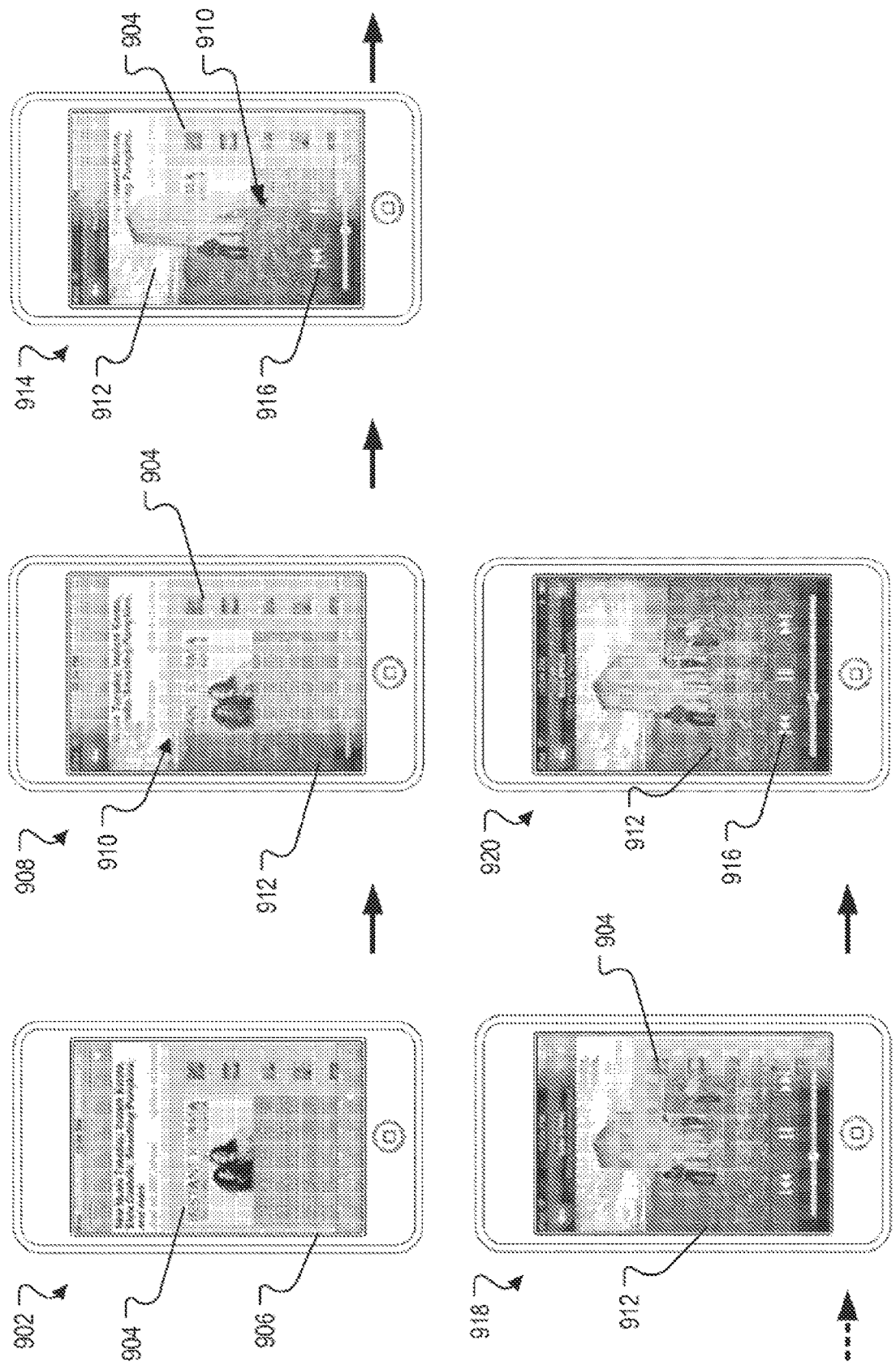
FIG. 9 is a sequence of screen shots depicting a wipe away animation effect on a mobile device.

FIG. 9 is a sequence of screen shots depicting a wipe away animation effect on a mobile device. The wipe away animation effect can include a gradual horizontal transition from a current view to a new view. For example, the wipe away animation effect can occur along a horizontal edge in a user interface where the current view transitions off the device screen, while the new view transitions onto the device screen. In effect, the wipe away animation can appear to fade the current view in favor of the new view in a horizontal sweeping motion. Thus, a vertical line of demarcation can occur between the images. In some implementations the line of demarcation can be blurred. In other implementations, the line of demarcation can be a precise division between images and can be presented in the user interface in any thickness.

In some implementations, the wipe away animation effect can occur upon user request. For example, the user can touch or provide input gesture to the device that a change in the user interface is desired. As described above, the user touch or gesture can include a double-tap of a control button to indicate that a change is desired in a user interface of screen shot 902, for example. Other user applied motions are possible.

In an example operational mode, a user may be viewing content in the user interface of screen shot 902. The content in this example is a webpage image 904. At some point, the user can request to view different content in the interface, such as an audio application view. Accordingly and upon user request, the mobile device may begin the wipe away transition by beginning to "scroll" a horizontal edge 906. As shown in screen shot 908, the wipe away animation is beginning to change the view in the user interface of screen shot 902. The horizontal edge 906 is shown in screen shot 908 as a line of demarcation 910 as the two images scroll across the user interface. At this point, the first image 904 is shown in the right portion of the interface of screen shot 908, while a second image 912 begins to wipe onto the left portion of the interface of screen shot 908. In effect, the transition can also be viewed as a wiping away of the first image 904 along the line of demarcation 910 to reveal the second image 912, which appears to lie beneath the first image 904 in the user interface of screen shot 908.

As shown in screen shot 914, the line of demarcation 910 has progressed across the screen to approximately half way between image 904 and image 912. An audio interface 916 appears as in overlay over a lower portion of image 912. In some implementations, the user can select a control element in the audio interface 916 as soon as the selectable control element is displayed in the user interface. For example, the user can select and use the audio interface 916 controls before the image animation is complete. In this example, the audio interface 916 may temporarily disassociate with the animation if the user selects the controls before a particular animation transition completes.

The wipe away animation continues in screen shot 918 and can complete in screen shot 920. Here, the new image 912 has completely replaced previous image 904, and the user can begin using the audio application including the controls of the audio interface 916, as requested. In some implementations, the wipe away animation effect can be performed in a clock pattern. In some implementations, the wipe away animation can occur vertically or diagonally across the screen of the device.

Clock Wipe Animation

Figure 10:
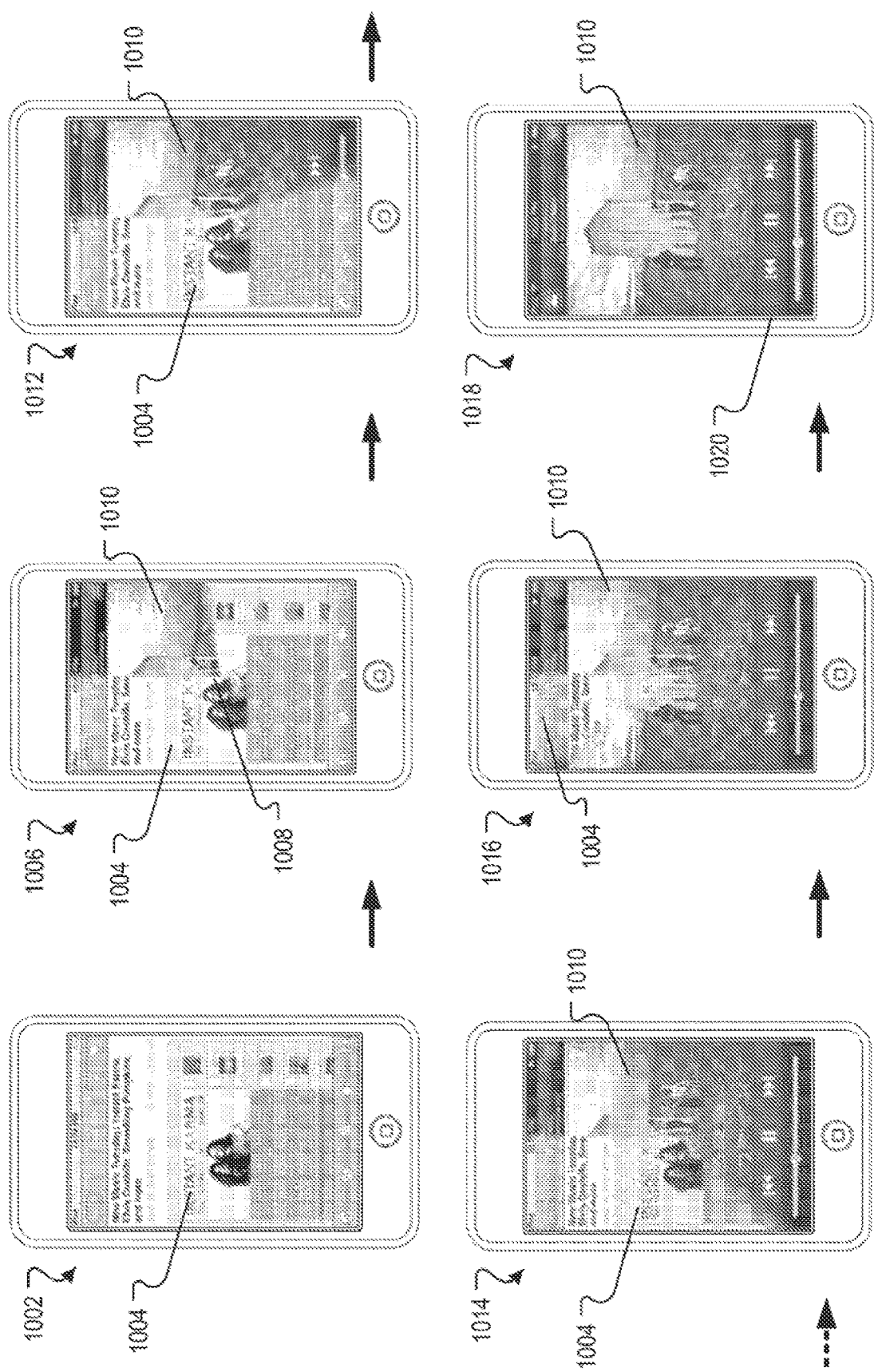
FIG. 10 is a sequence of screen shots depicting a radial wipe animation effect on a mobile device.

FIG. 10 is a sequence of screen shots depicting a clock wipe animation effect on a mobile device. In this example, the wipe away pattern can occur in a radial or clock hand sweep-like pattern. In particular, the current view in a user interface of the mobile device can appear to be wiped away in a radial pattern to reveal the new view in the user interface. The current view can be replaced by the new view as the animation sweeps a radius around a center point of the interface, revealing the new view behind the sweeping radius.

As an example, a user may be viewing content in the user interface of screen shot 1002. The content in this example is again a webpage image 1004. At some point, the user can request to view different content in the interface, such as an audio application view, and the mobile device may begin the clock wipe animation by sweeping a radius around a center point of the user interface. The screen shot 1006 depicts a new image 1010 revealed below or replacing the current image 1004 in a radial pattern about center point 1008. As shown in screen shot 1006, the radial sweep begins at the center point 1008 pointing upward to the 12:00 position on a standard analog clock. In some implementations, the clock wipe animation can be configured to begin anywhere on the screen.

In screen shots 1012, 1014, and 1016, the clock wipe animation continues in a clockwise direction as more of the image 1010 is shown and less of the image 1004 is shown. In some implementations, the clock wipe can be performed in a counterclockwise direction.

A screen shot 1018 displays the fully transitioned image 1010 resulting from the user-entered request to change content. After the clock wipe animation effect is completed, the interface of screen shot 1018 depicts the image 1010 as a view of an audio application usable by the user of the device. In some implementations, an audio interface (e.g., audio interface 1020) appears as an overlay over the view of the audio application.

Ripple Animation

Figure 11:
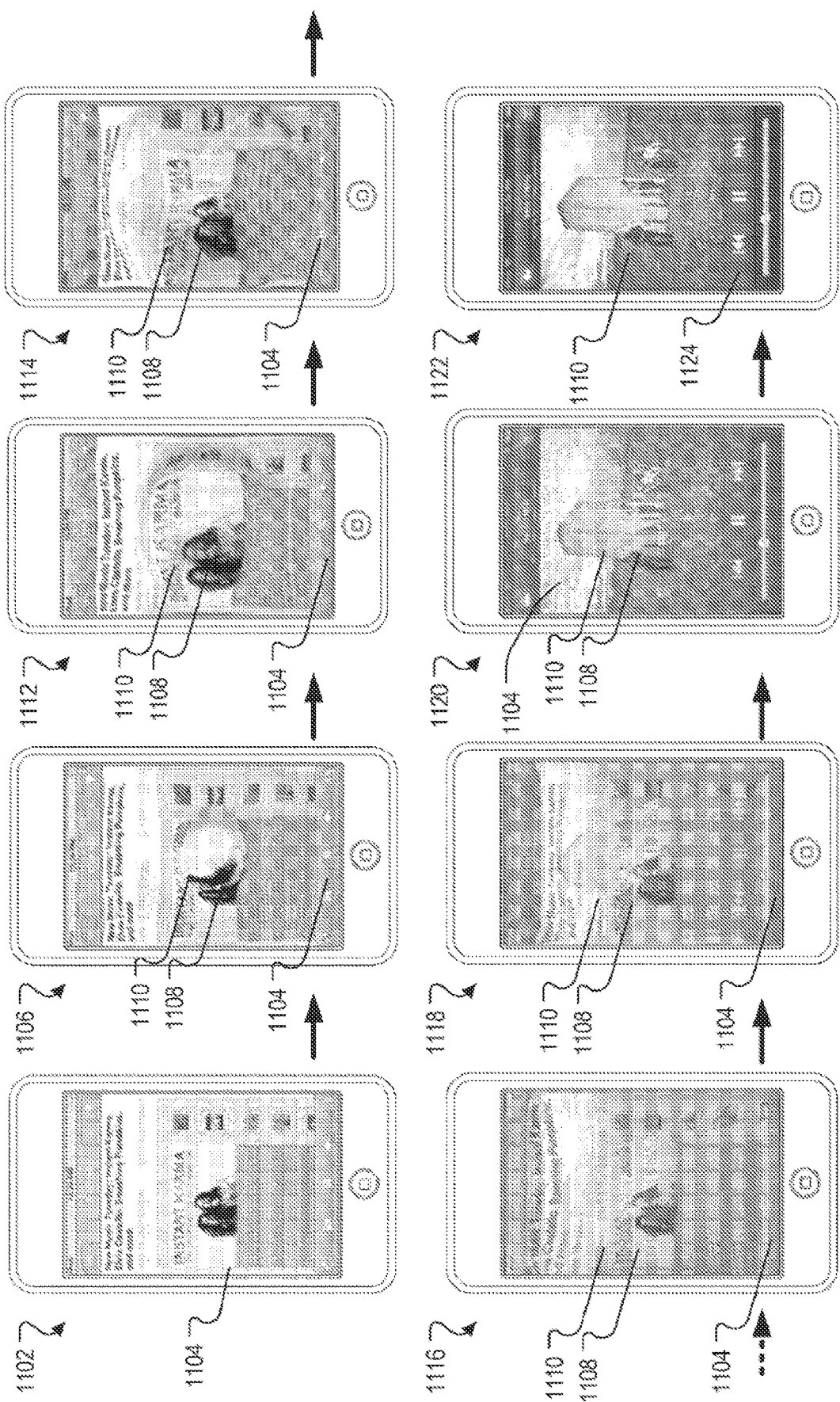
FIG. 11 is a sequence of screen shots depicting a ripple animation effect on a mobile device.

FIG. 11 is a sequence of screen shots depicting a ripple animation effect on a mobile device. The ripple animation effect can include a moving and or an expanding ripple or ripples appearing as a moving fade out of the current view and a moving fade in of a new view. In general, the ripple animation can spread outward over a user interface from an initial location until the new user interface is displayed. In some implementations, the ripple animation can appear to mimic a wave motion or undulation.

Turning to screen shot 1102, a user may be viewing a webpage image 1104 and wish to switch the view to an audio application view with a now playing audio interface on the mobile device. As such, the user may request to view an audio application view, such as the example view in user interface 500, for an audio application on the mobile device. As shown in screen shot 1106, the device can begin to animate the ripple 1108 upon receiving the user's request. The ripple 1108 shows a new image 1110 partially superimposed on the surrounding webpage image 1104.

Now turning to screen shot 1112, the ripple animation effect is affecting a larger portion of the images 1104 and 1110. Similarly, the screen shots 1114, 1116, and 1118 show blends between the images 1104 and 1110. In some implementations, over time, the effect can begin to dampen as the ripple resonates through the user interface. At some point, the webpage image 1104 may become out of focus and semi-transparent as it fades away and image 1110 ripples into view in the user interface. The screen shots 1118 and 1120 show the fading of image 1104 and the emerging of image 1110, respectively. A screen shot 1122 shows the new image 1110, and the user can begin using the newly displayed audio application in the user interface of screen shot 1122. In some implementations, an audio interface (e.g., audio interface 1124) appears as an overlay over the view of the audio application.

Burning Hole Animation

Figure 12:
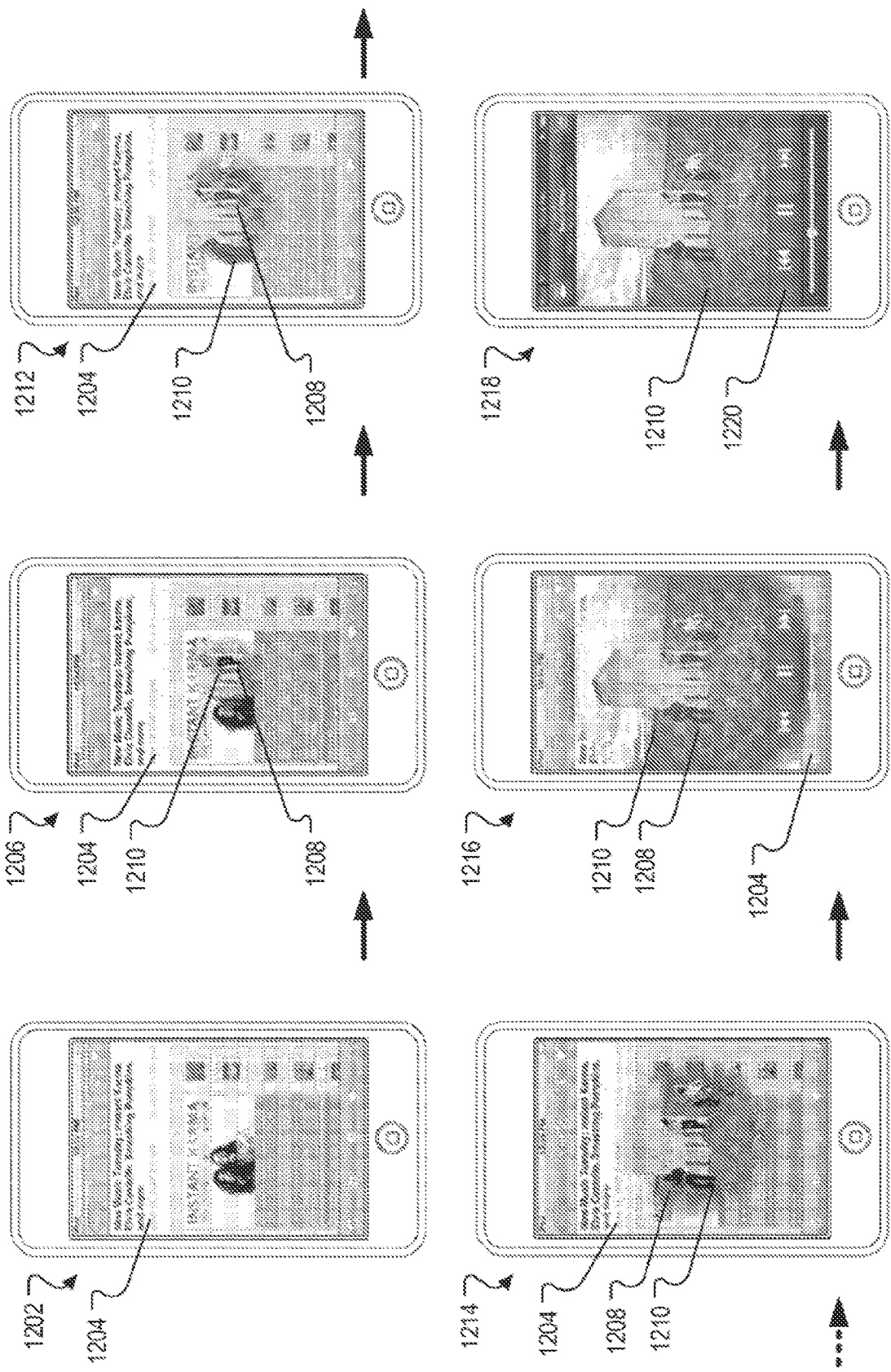
FIG. 12 is a sequence of screen shots depicting a burning hole animation effect on a mobile device.

FIG. 12 is a sequence of screen shots depicting a burning hole animation effect on a mobile device. The burning hole animation can be a wipe animation that wipes away the current view in a particular shape (e.g., a circle or a star) in the user interface. In the example shown in FIG. 12, the shape is a circular wipe that appears to burn an enlarging circular iris through a current view thereby revealing or replacing the "burned" view with a new view. In some implementations, the burning hole animation may use a shrinking animation rather than an enlarging animation to replace user interface images. Other shapes for the hole are possible.

Similar to the above described examples, while viewing the user interface of screen shot 1202 containing a webpage image 1204, the user of the device can request a user interface change. For example, the user may request to view an audio application view with a now playing interface, such as the example view in user interface 500, for an audio application on the device. As shown in screen shot 1206, the device can begin to animate a burning hole 1208 upon receiving the user's request. The burning hole 1208 shows a new image 1210, while the surrounding image is that of webpage image 1204.

Referring to screen shot 1212, a larger portion of the image 1210 is displayed through the enlarging opening of the burning hole 1208. The user interface of screen shot 1212 still contains portions of webpage image 1204, but less so than in screen shot 1206. Similarly, the burning hole 1208 is larger in screen shot 1214 and larger yet in screen shot 1216. Finally, the burning hole animation is shown completed in screen shot 1218. Here, the new image 1210 is fully visible in the user interface, whereas image 1204 has "burned away." In some implementations, an audio interface (e.g., audio interface 1220) appears as an overlay over the view of the audio application, as represented by image 1210. In this example, the burning hole 1208 is shown beginning from the center outward. However, in some implementations, the burning hole may begin anywhere on the user interface.

In some implementations, a dissolve animation effect can be used to transition from one image to another. For example, an image in a user interface can gradually transition to another image by interpolation. In particular, the device can gradually interpolate between the red, green, and blue (RGB) values of each pixel of the first image and the RGB values of each corresponding pixel of the second image. The dissolve animation can soften the first image while sharpening the second image. At some point, the two images may appear blurred together until the first image is "dissolved" and the second image is brought in focus.

In some implementations, a matrix wipe animation can be used to transition from one view to another view in the user interface of the device. For example, a patterned transition can be programmed to wipe from one view to another. The matrix wipe can use various patterns, such as a grid, stars, boxes, pixels, etc.

In some implementations, the user can configure the device 100 or 101 with the desired animation effects. In some implementations, one animation effect can be assigned to any or all user interface changes. For example, the user can configure the device 100 or 101 to display a particular wipe effect when switching from any application view to an audio application view, such as the example view in user interface 500. In other implementations, the user can configure separate animation effects for each transition in the user interface of the mobile device.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

A number of implementations have been described. Nevertheless, it will be understood that various modifications may be made. For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
   at an electronic device with a touch screen:
   while playing a media file on the electronic device, receiving a first user input requesting that a media interface be displayed on the touch screen;
   displaying a first media interface on the touch screen as an overlay on the touch screen in accordance with the first user input, the first media interface including information associated with the media file and first playback controls;
   while playing the media file on the electronic device, receiving a second user input requesting that a media interface be displayed on the touch screen; and
   displaying a second media interface on the touch screen as the overlay on the touch screen in accordance with the second user input, the second media interface different from the first media interface, the second media interface including the first playback controls, and the second media interface having a different number of user interface elements than a number of user interface elements in the first media interface.

2. The method of claim 1, wherein the media file is playing on the electronic device using a media application and the first user input is received while concurrently displaying a view of an application different from the media application on the touch screen.

3. The method of claim 2, wherein the first media interface replaces the view of the application different from the media application on the touch screen.

4. The method of claim 1, wherein the first user input comprises a touch gesture on the touch screen.

5. The method of claim 1, wherein the first user input comprises pressing a hardware button.

6. The method of claim 1, wherein the overlay is partially transparent.

7. The method of claim 6, wherein a background image displayed on the touch screen is visible through the overlay.

8. The method of claim 1, wherein the information associated with the media file includes a name of the media file, a length of the media file, a title of a collection of media files including the media file, a length of the collection of media files, a number indicating a position of the media file within the collection of media files, an elapsed time of playing the media file, a remaining time of playing the media file, a performer of the media file, or an image representing the media file or the collection of media files, or any combination thereof.

9. The method of claim 1, further comprising:
   while displaying the first media interface on the touch screen, receiving a second third user input requesting to hide or exit the media interface; and
   ceasing displaying the first media interface on the touch screen in accordance with the second user input.

10. The method of claim 9, wherein ceasing display of the first media interface on the touch screen comprises displaying a view of an application, different from a media application used to play the media file, on the touch screen.

11. The method of claim 9, further comprising:
    continuing playing the media file after ceasing displaying the first media interface on the touch screen.

12. The method of claim 9, further comprising:
    ceasing playing the media file concurrently with ceasing displaying the first media interface on the touch screen.

13. The method of claim 1, further comprising:
    receiving a selection of an element of the first media interface; and
    adjusting playback of the media file based on the selection,
    wherein the selection of the element of the first media interface is received while the electronic device is locked.

14. The method of claim 1, wherein the first user input is received while the electronic device is locked.

15. The method of claim 1, wherein displaying the first media interface on the touch screen as the overlay on the touch screen occurs as part of an animation.

16. The method of claim 15, wherein the animation includes fading out content over which the first media interface is displayed as the overlay.

17. The method of claim 15, wherein the animation includes shrinking content over which the first media interface is displayed as the overlay.

18. The method of claim 1, wherein the first media interface is overlaid on a first background image and the second media interface is overlaid on a second background image different from the first background image.

19. The method of claim 1, wherein the second user input is received while the first media interface is not displayed on the touch screen.

20. The method of claim 1, wherein the second user input is received while the first media interface is displayed on the touch screen.

21. The method of claim 1, wherein the second user input requesting that a media interface be displayed on the touch screen includes interaction with a user interface element displayed on the touch screen concurrently with the first media interface, the element different from the first playback controls.

22. A non-transitory computer-readable storage medium storing instructions configured to be executed by one or more processors of an electronic device having a touch screen, the instructions including instructions for:
    while playing a media file on the electronic device, receiving a first user input requesting that a media interface be displayed on the touch screen;
    displaying a first media interface on the touch screen as an overlay on the touch screen in accordance with the first user input, the first media interface including information associated with the media file and first playback controls;

while playing the media file on the electronic device, receiving a second user input requesting that a media interface be displayed on the touch screen; and displaying a second media interface on the touch screen as the overlay on the touch screen in accordance with the second user input, the second media interface different from the first media interface, the second media interface including the first playback controls, and the second media interface having a different number of user interface elements than a number of user interface elements in the first media interface.

23. The non-transitory computer-readable storage medium of claim 22, wherein the media file is playing on the electronic device using a media application and the first user input is received while concurrently displaying a view of an application different from the media application on the touch screen.

24. The non-transitory computer-readable storage medium of claim 23, wherein the first media interface replaces the view of the application different from the media application on the touch screen.

25. The non-transitory computer-readable storage medium of claim 22, wherein the first user input comprises a touch gesture on the touch screen.

26. The non-transitory computer-readable storage medium of claim 22, wherein the first user input comprises pressing a hardware button.

27. The non-transitory computer-readable storage medium of claim 22, wherein the overlay is partially transparent.

28. The non-transitory computer-readable storage medium of claim 27, wherein a background image displayed on the touch screen is visible through the overlay.

29. The non-transitory computer-readable storage medium of claim 22, wherein the information associated with the media file includes a name of the media file, a length of the media file, a title of a collection of media files including the media file, a length of the collection of media files, a number indicating a position of the media file within the collection of media files, an elapsed time of playing the media file, a remaining time of playing the media file, a performer of the media file, or an image representing the media file or the collection of media files, or any combination thereof.

30. The non-transitory computer-readable storage medium of claim 22, wherein the instructions further include instructions for:
  while displaying the first media interface on the touch screen, receiving a third user input requesting to hide or exit the first media interface; and
  ceasing displaying the first media interface on the touch screen in accordance with the third user input.

31. The non-transitory computer-readable storage medium of claim 30, wherein ceasing display of the first media interface on the touch screen comprises displaying a view of an application, different from a media application used to play the media file, on the touch screen.

32. The non-transitory computer-readable storage medium of claim 30, wherein the instructions further include instructions for:
  continuing playing the media file after ceasing displaying the first media interface on the touch screen.

33. The non-transitory computer-readable storage medium of claim 30, wherein the instructions further include instructions for:
  ceasing playing the media file concurrently with ceasing displaying the first media interface on the touch screen.

34. The non-transitory computer-readable storage medium of claim 22, wherein the instructions further include instructions for:
  receiving a selection of an element of the first media interface; and
  adjusting playback of the media file based on the selection,
  wherein the selection of the element of the first media interface is received while the electronic device is locked.

35. The non-transitory computer-readable storage medium of claim 22, wherein the first user input is received while the electronic device is locked.

36. The non-transitory computer-readable storage medium of claim 22, wherein displaying the first media interface on the touch screen as the overlay on the touch screen occurs as part of an animation.

37. The non-transitory computer-readable storage medium of claim 36, wherein the animation includes fading out content over which the first media interface is displayed as the overlay.

38. The non-transitory computer-readable storage medium of claim 36, wherein the animation includes shrinking content over which the first media interface is displayed as the overlay.

39. An electronic device comprising:
  one or more processors;
  a touch screen; and
  one or more memories storing instructions configured to be executed by the one or more processors, the instructions including instructions for:
    while playing a media file on the electronic device, receiving a first user input requesting that a media interface be displayed on the touch screen;
    displaying a first media interface on the touch screen as an overlay on the touch screen in accordance with the first user input, the first media interface including information associated with the media file and first playback controls;
    while playing the media file on the electronic device, receiving a second user input requesting that a media interface be displayed on the touch screen; and
    displaying a second media interface on the touch screen as the overlay on the touch screen in accordance with the second user input, the second media interface different from the first media interface, the second media interface including the first playback controls, and the second media interface having a different number of user interface elements than a number of user interface elements in the first media interface.

40. The electronic device of claim 39, wherein the media file is playing on the electronic device using a media application and the first user input is received while concurrently displaying a view of an application different from the media application on the touch screen.

41. The electronic device of claim 40, wherein the first media interface replaces the view of the application different from the media application on the touch screen.

42. The electronic device of claim 39, wherein the first user input comprises a touch gesture on the touch screen.

43. The electronic device of claim 39, wherein the first user input comprises pressing a hardware button.

44. The electronic device of claim 39, wherein the overlay is partially transparent.

45. The electronic device of claim 44, wherein a background image displayed on the touch screen is visible through the overlay.

46. The electronic device of claim 39, wherein the information associated with the media file includes a name of the media file, a length of the media file, a title of a collection of media files including the media file, a length of the collection of media files, a number indicating a position of the media file within the collection of media files, an elapsed time of playing the media file, a remaining time of playing the media file, a performer of the media file, or an image representing the media file or the collection of media files, or any combination thereof.

47. The electronic device of claim 39, wherein the instructions further include instructions for:
while displaying the first media interface on the touch screen, receiving a third user input requesting to hide or exit the first media interface; and
ceasing displaying the first media interface on the touch screen in accordance with the second user input.

48. The electronic device of claim 47, wherein ceasing display of the first media interface on the touch screen comprises displaying a view of an application, different from a media application used to play the media file, on the touch screen.

49. The electronic device of claim 47, wherein the instructions further include instructions for:
continuing playing the media file after ceasing displaying the first media interface on the touch screen.

50. The electronic device of claim 47, wherein the instructions further include instructions for:
ceasing playing the media file concurrently with ceasing displaying the first media interface on the touch screen.

51. The electronic device of claim 39, wherein the instructions further include instructions for:
receiving a selection of an element of the first media interface; and
adjusting playback of the media file based on the selection,
wherein the selection of the element of the media interface is received while the electronic device is locked.

52. The electronic device of claim 39, wherein the first user input is received while the electronic device is locked.

53. The electronic device of claim 39, wherein displaying the first media interface on the touch screen as the overlay on the touch screen occurs as part of an animation.

54. The electronic device of claim 53, wherein the animation includes fading out content over which the first media interface is displayed as the overlay.

55. The electronic device of claim 53, wherein the animation includes shrinking content over which the first media interface is displayed as the overlay.

\* \* \* \* \*